Aug. 4, 1953

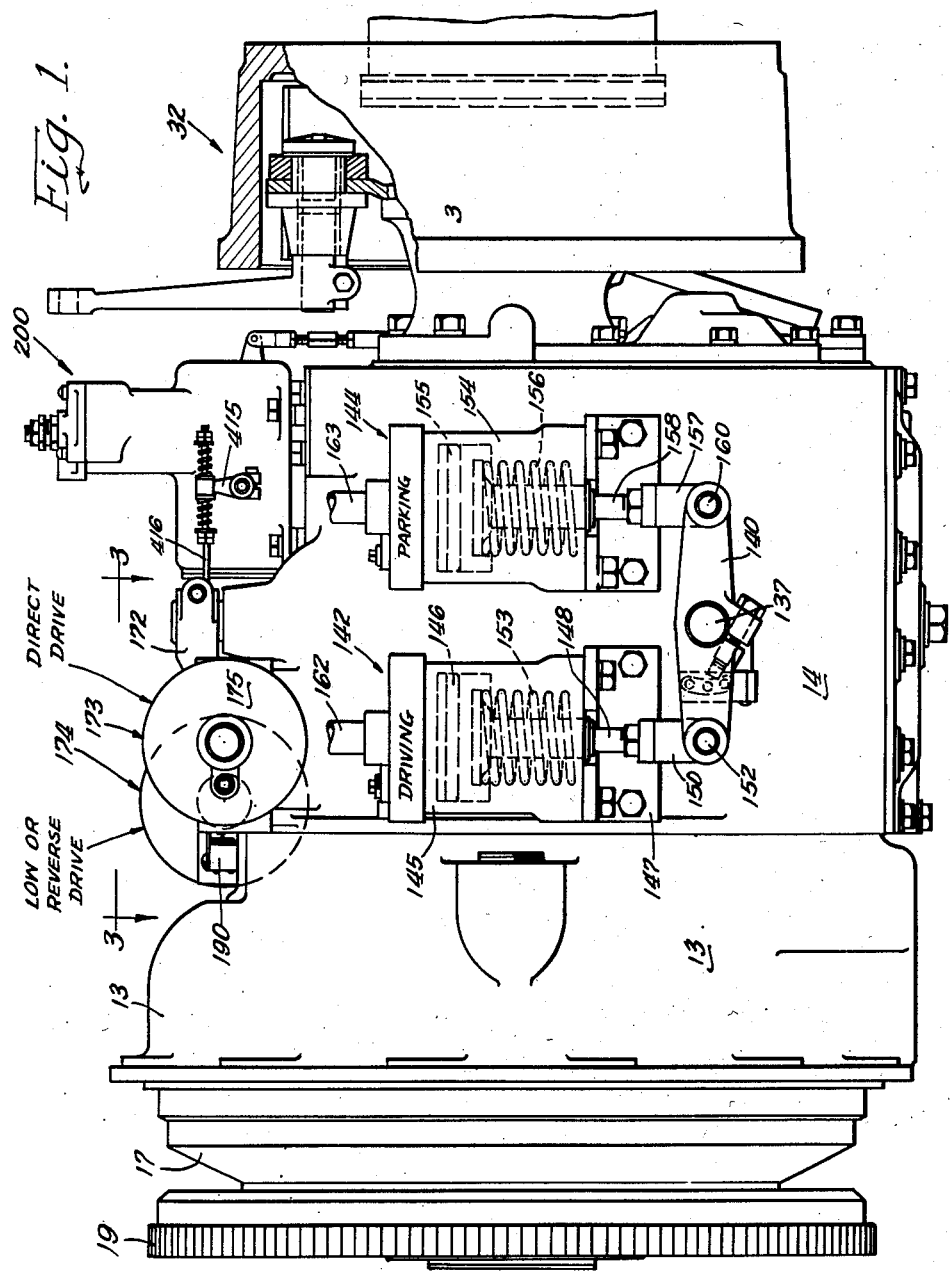

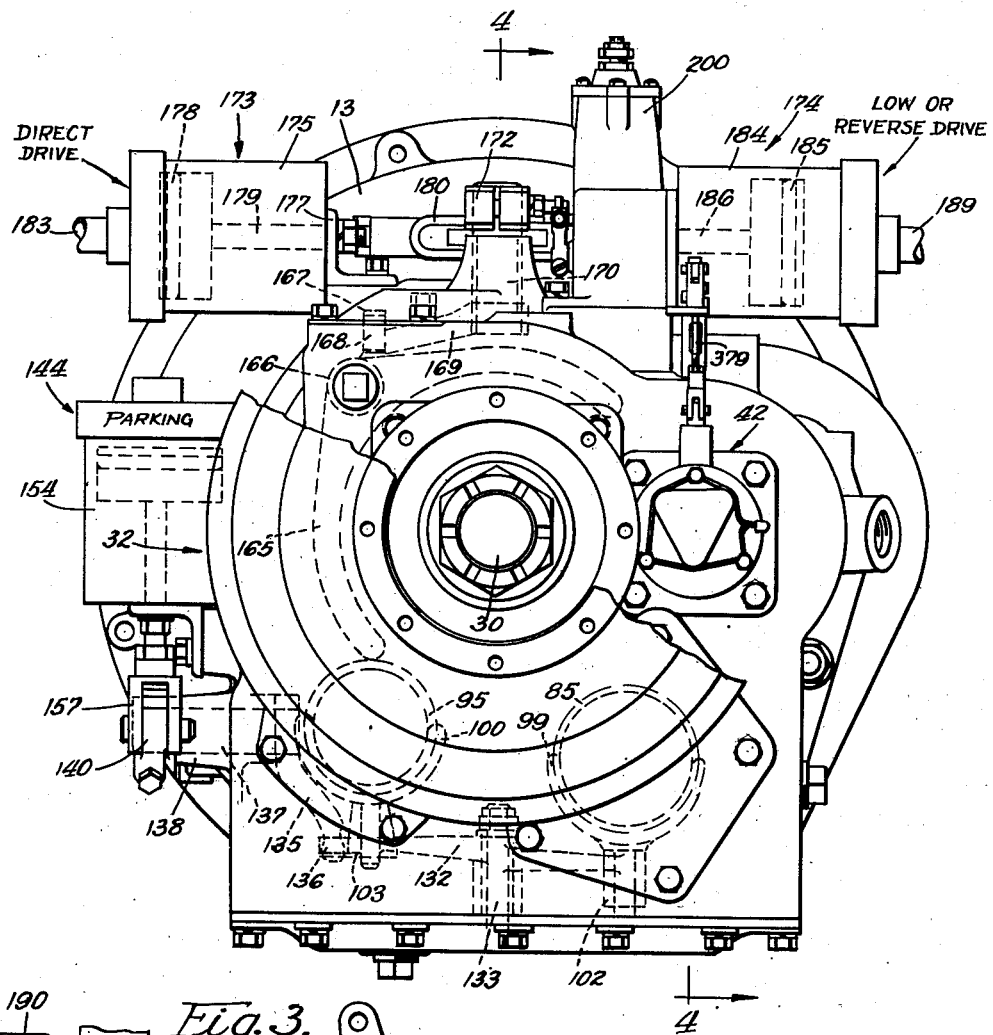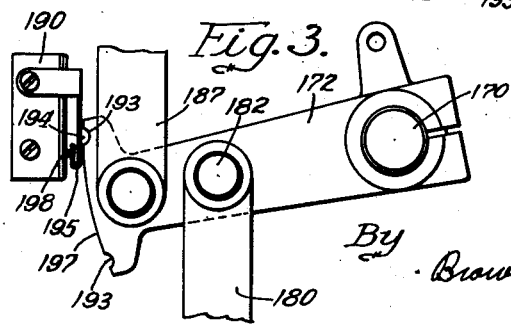

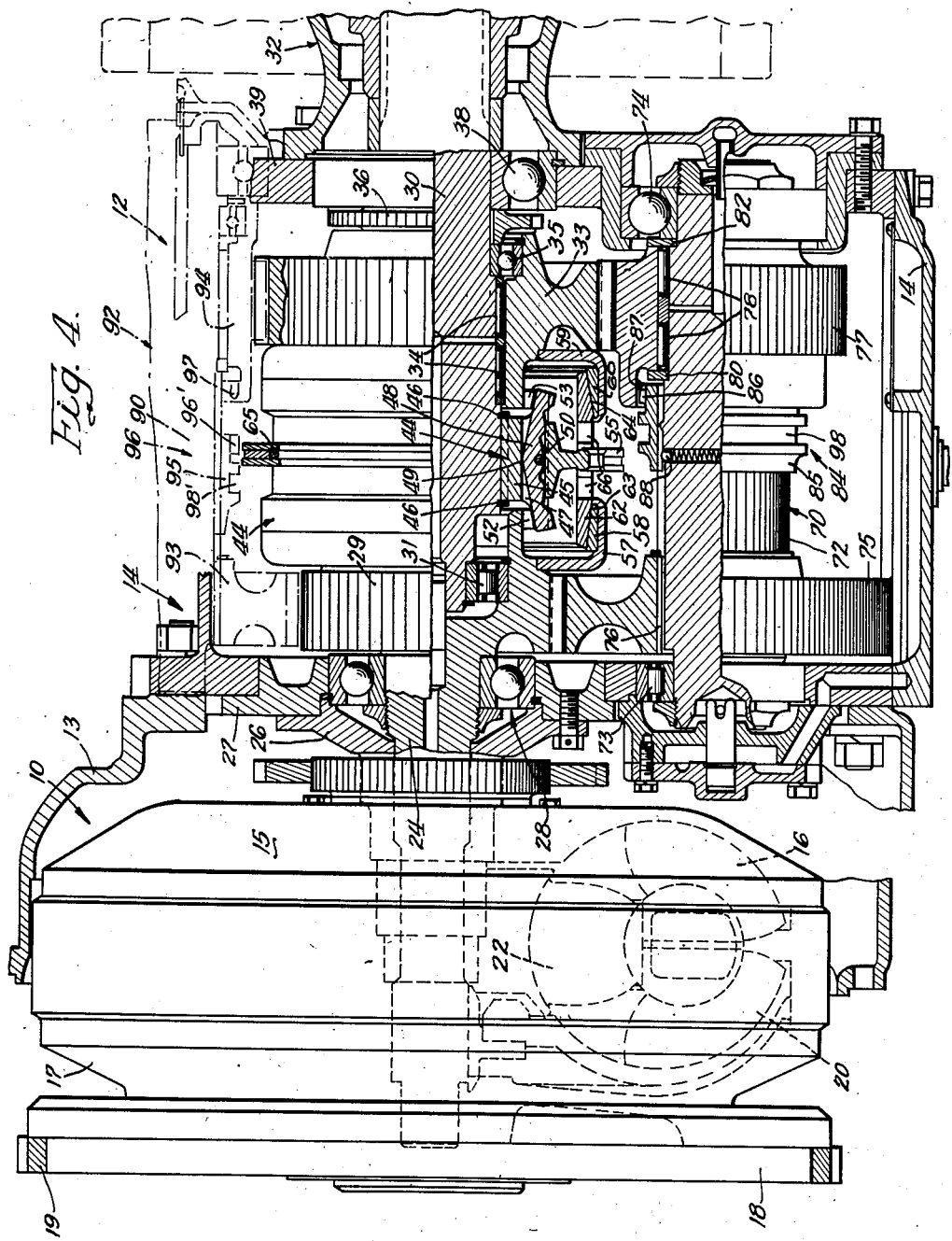

R. LAPSLEY 2,647,413

TRANSMISSION

Filed April 16, 1948

Inventor:
Robert Lapsley
By Brown, Jackson, Boettcher & Dienner,
Att'ys.

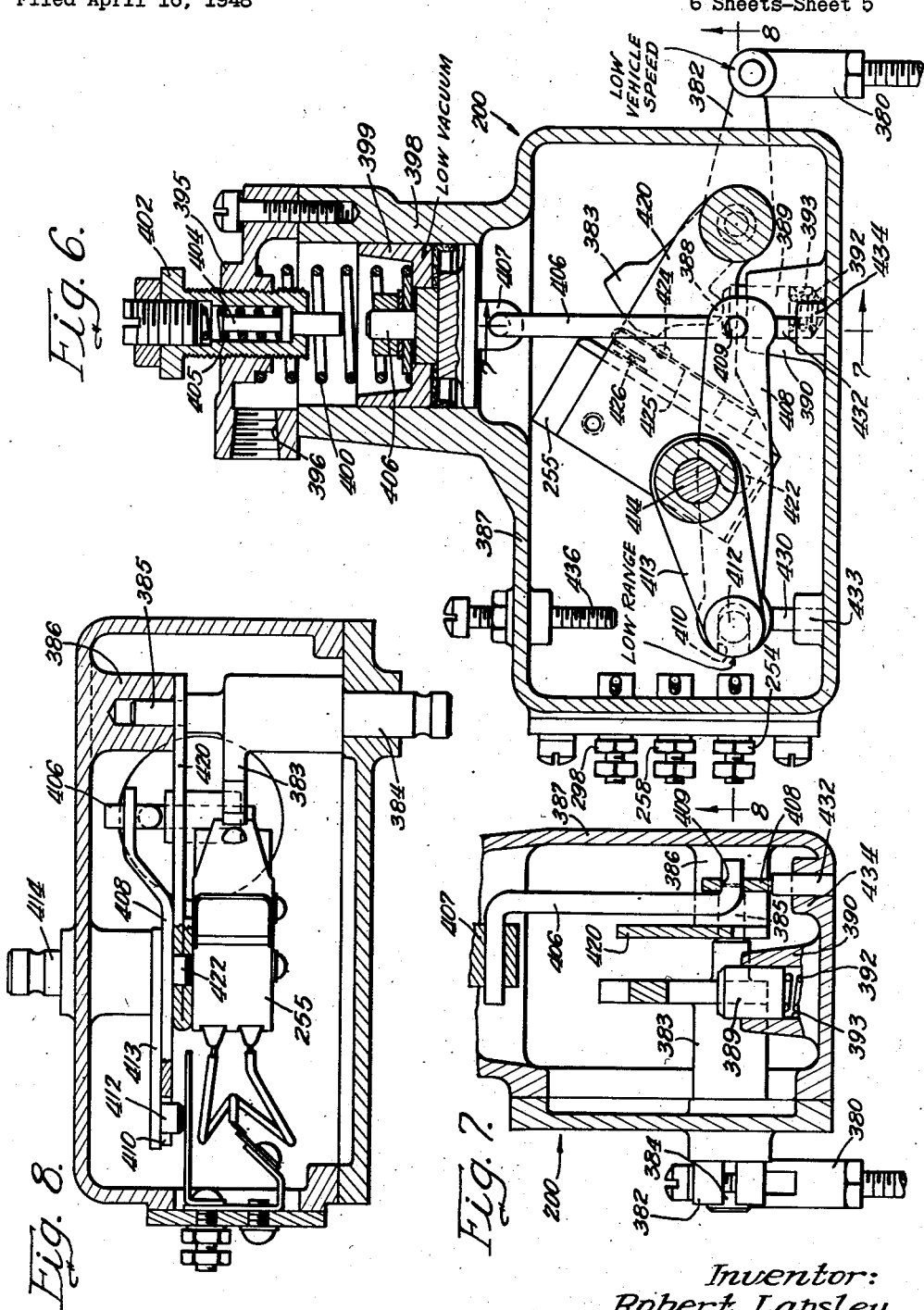

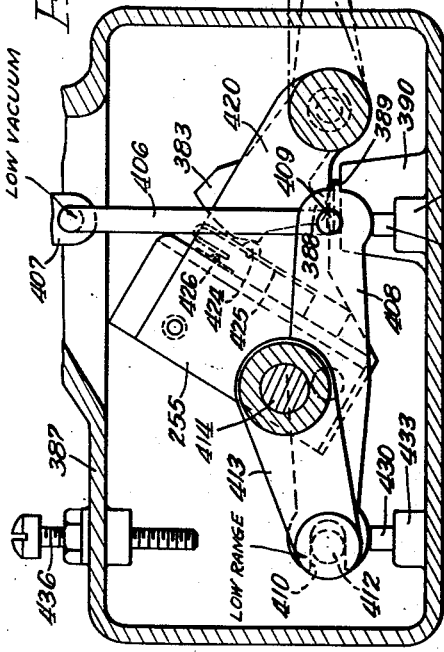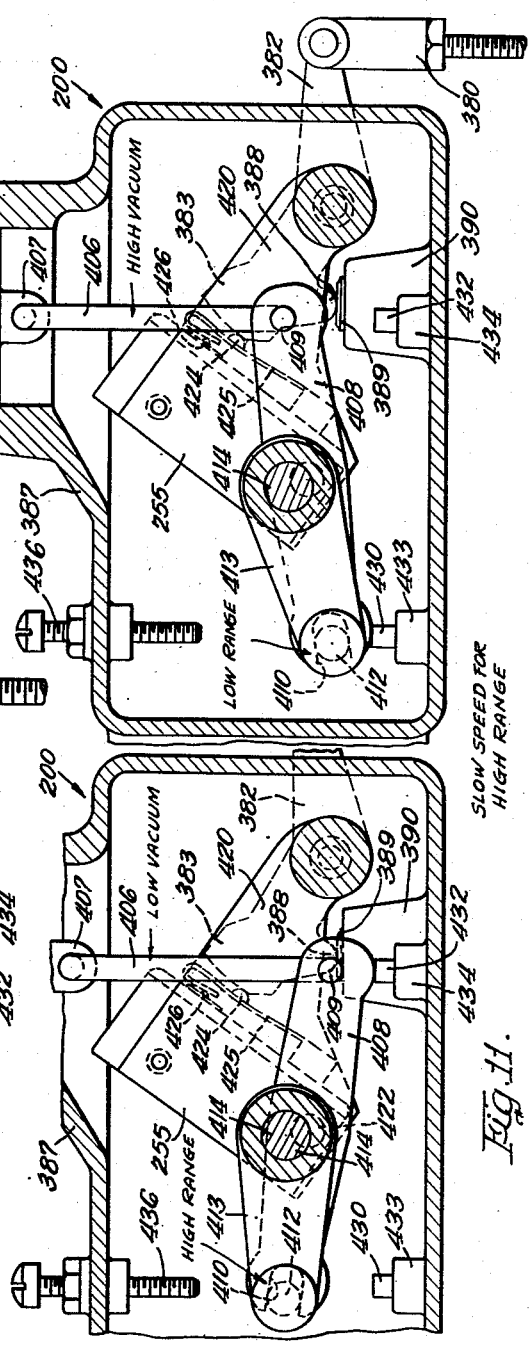

UNITED STATES PATENT OFFICE 2,647,413

TRANSMISSION

Robert Lapsley, Buchanan, Mich., assignor to Clark Equipment Company, Buchanan, Mich., a corporation of Michigan Application April 16, 1948, Serial No. 21,456

28 Claims. (Cl. 74—472)

My present invention relates to an improvement in a transmission and a control system therefor.

It is well known in the art to provide a transmission for automotive vehicles, such as passenger vehicles, trucks and busses comprising a fluid torque converter unit and change speed gear mechanism with the torque converter unit providing infinitely variable torque multiplication in each of the respective gear ratios of the change speed gear mechanism. My present invention is primarily concerned with a transmission and control means therefor in which the transmission is of the character indicated in which the change speed gear mechanism preferably comprises gear means providing two forward drive ratios and reverse drive.

It is an object of my invention to provide a novel form of change speed gear mechanism primarily for a transmission of the character indicated by means of which a plurality of forward drive ratios and reverse drive between drive and driven shaft of the transmission may be effected.

A further object of my invention is to provide a change speed gear mechanism primarily for use between drive and driven shafts for a transmission of the character noted having gear means comprising a gear rotatable on the driven shaft and forward and reverse gear means including gears having constant meshing engagement with the rotatable gear on the driven shaft together with clutch means operable for clutching the rotatable gear on the driven shaft thereto, and a pair of clutch means one for each of the forward and reverse gear means operatively interconnected so that when one of the latter pair of clutch means is engaged the other is disengaged.

A further object is to provide change speed gear mechanism of the character last noted in which the pair of clutch means may both be disengaged.

A further object is to provide a change speed gear mechanism between drive and driven shafts of the transmission comprising gear means for effecting a plurality of forward drive ratios between the drive and driven shafts including a first clutch means operable to effect one forward drive ratio, and a second clutch means operable together with the first clutch means to effect a second forward drive ratio, and third clutch means operatively interconnected with the second clutch means so that when engaged said second clutch means is disengaged to effect reverse drive between the drive and driven shaft.

A further object is to provide a change speed gear mechanism between drive and driven shafts comprising gear means including a drive gear for the drive shaft and a gear rotatable on the driven shaft, clutch means between the drive gear and the driven shaft operable in one position to clutch the driven shaft to the drive shaft to effect one forward drive ratio, second clutch means operable when engaged together with said first clutch means in a second position for clutching the driven gear to the driven shaft to effect a second forward drive ratio, and a third clutch means operatively interconnected with the second clutch means so that when engaged said second clutch is disengaged and which third clutch when engaged with said first clutch in its second position provides for reverse drive between the drive and driven shafts.

In order to achieve the aforesaid objects I propose to provide a change speed gear mechanism having a drive shaft including a drive gear, and a driven shaft which provides for rotatably supporting a driven gear. A first clutch means is arranged between the driven shaft and the drive shaft with the clutch means in one position being adapted to clutch the drive shaft to the driven shaft to provide for effecting one forward ratio drive through the transmission. This first clutch means also has a second position in which the driven gear of the driven shaft may be clutched thereto. With such arrangement of parts I provide a countershaft carrying a first gear having constant meshing engagement with the drive gear of the drive shaft and a second gear rotatable on the countershaft and having constant meshing engagement with the driven gear of the driven shaft. A second countershaft or reverse idler shaft is also provided, and it has a gear having constant meshing engagement with the first gear of the first countershaft and a second gear rotatable thereon and having constant meshing engagement with the driven gear on the driven shaft. A clutch is provided for selectively clutching the gear rotatable on the first countershaft thereto. Also a clutch is provided for the second countershaft for clutching thereto the gear rotatable mounted thereon and having meshing engagement with the driven gear of the driven shaft. In a change speed gear mechanism as thus constructed it will be observed that upon actuation of the first clutch means to the clutch the driven shaft to the driven shaft that one forward ratio drive or one to one ratio drive may be effected from the drive shaft to the driven shaft.

In the preferred form of my invention the drive shaft has connection to the driven element of a fluid torque converting unit so that infinitely variable torque multiplication will be transmitted through the drive shaft to the driven shaft of the transmission with the first clutch engaged in the position noted. In order to effect a second forward ratio drive the first clutch means is adapted to be actuated to a second position for clutching the driven gear to the driven shaft. With the first clutch thus actuated the clutch means of the first countershaft may be engaged to clutch the gear rotatable thereon to the countershaft, and since the latter gear has constant meshing engagement with the driven gear on the driven shaft a second forward ratio drive of the ratio of the gear means of the first countershaft will be effected from the drive shaft to the driven shaft. For purposes of effecting reverse drive between the drive and driven shafts and second clutch means above referred to is disengaged and the clutch means of the second countershaft or reverse idler shaft is engaged to clutch the gear rotatable thereon to the second countershaft, and since it has constant meshing engagement with the driven gear of the driven shaft and the fixed second countershaft gear has meshing engagement with the fixed gear of the first countershaft which in turn has meshing engagement with the drive gear reverse drive is provided through the transmission.

Preferably the second and third clutch means of the first and second countershafts are operatively interconnected so that when one of the clutches is engaged the other is disengaged. Also these clutches are both adapted to be disengaged to provide a neutral for the transmission.

The aforedescribed transmission is thus operable to effect with the second clutch means engaged and the third clutch means disengaged by actuation of the first clutch means from one position to the other position thereof shifting from one forward drive ratio to a second forward drive ratio. Also, selection for forward and reverse drive may readily be accomplished with the first clutch means engaged to the driven gear of the driven shaft by engaging the second clutch means and disengaging the first clutch means, and vice versa.

It is a further object of my invention to provide a control system for the aforementioned change speed gear mechanism in which the latter may be actuated manually or automatically.

The above described transmission lends itself to actuation in two ways which for purposes of disclosing my invention I shall hereinafter refer to as the "driving range" and the "parking range." The control system of my invention includes a master control switch mounted adjacent to the operator for selecting either the driving or parking ranges. The driving range as will in greater detail appear hereinafter is concerned with the automatic actuation of the transmission from one forward drive ratio or low range to the other forward drive ratio or high range and vice versa in response to the speed of a vehicle in which the transmission is embodied and the intake manifold vacuum of the prime mover, such as an internal combustion engine, for the vehicle. Also in driving range the transmission may be actuated so that it may be maintained in high forward range or low forward range of the two forward drive ratios. The parking range is for purposes primarily of parking or turning the vehicle when frequent shifting between forward and reverse drive is necessary.

The control system of my invention is operable upon actuation of master control switch to effect the energization of solenoid valves for admitting air under pressure to a plurality of cylinder and piston devices having connection with the aforementioned clutches of the change speed gear mechanism to provide for the power shifting of the several clutches of the transmission.

The master control switch is positionable to effect either the parking range or the driving range with the master control switch being adapted to be positioned in the parking and driving ranges from a neutral position to one of two positions selectively for effecting actuation of the transmission. With the master control switch positioned for effecting the parking range the switch lever is positionable to effect either forward or reverse drive through the transmission. Forward drive in parking range between the drive and driven shafts is effected by engaging the first clutch to clutch the driven shaft to the drive shaft of the transmission for high forward range. Reverse drive in parking range between the drive and driven shafts is adapted to be effected by engagement of the first clutch means to clutch the gear rotatable on the driven shaft thereto, and to engage the third clutch means to clutch the rotatable gear on the second countershaft or reverse idler shaft to the latter so that the gear means between the second countershaft, the first countershaft and the drive shaft effect reverse rotation of the driven shaft.

Upon selection of driving range the master control switch is operable in one position to actuate the transmission for forward drive in high forward range or low forward range by effecting engagement of the first clutch means to clutch the gear rotatable on the driven shaft thereto, and to engage the second clutch means to clutch the rotatable gear on the first countershaft thereto so that forward drive in low range is imparted to the driven shaft from the drive shaft through the first countershaft and the gear means thereof. In the described positions of the parts the third clutch means for the second countershaft or reverse idler shaft and the reverse gearing is disengaged, and the change speed gear mechanism is maintained in position for low forward range drive only. In the second position of the master control switch in driving range the second clutch means for the first countershaft is caused to be engaged to clutch the rotatable gear of the first countershaft thereto, and the first clutch means between the drive shaft, the driven shaft, and the gear rotatable on the driven shaft is operable in response to speed and intake manifold vacuum of the engine of the vehicle to effect actuation of the first clutch means to clutch either the driven shaft to the drive shaft for high forward range, or to clutch the gear rotatable on the driven shaft thereto for low forward range to effect one or the other of the forward drive ratios through the transmission.

In the preferred form of my present invention the first clutch means is of a character so that with the change speed mechanism actuated to provide one forward drive ratio and upon vehicle speed and engine vacuum conditions being such that a shift to the other forward drive ratio is to be effected the first clutch is operative to effect synchronously engagement of the gear means in the shift from forward speed ratio to the other forward speed ratio through the change speed gear mechanism.

In the transmission of my present invention the first clutch means preferably is of a character embodying two sets of clutch teeth formed so that unless retained in engaged position they are caused to be disengaged by the torque therebetween, and which when one set of clutch teeth are engaged one forward drive ratio is provided between the drive and driven shafts, and the other set of clutch teeth when engaged provides for the second forward drive ratio between the drive and driven shafts. The clutch means further comprises a shiftable collar for effecting the selective engagement of either of the two sets of clutch teeth and includes synchronizing means for synchronizing parts to be clutched together before engagement of the clutch teeth. In such a clutch only small force is required to shift the collar away from either set of clutch teeth. A further preferred feature of my invention resides in providing an arrangement whereby, for example, low pressure air may be used to shift the collar member to effect disengagement of one set of clutch teeth preparatory to engagement of the other set of clutch teeth for a shift from one forward drive to the other forward drive. In the shifting of the collar as last described and while the synchronizing means is operative to bring the parts in synchronism for the shift being made the air pressure for shifting the collar to engage the clutch teeth may be built up so that at the instant the parts to be clutched together are in synchronism the collar is shifted to clutch such parts together. In the transmission hereinafter disclosed I have shown a construction in which air under pressure is utilized as the power means for actuating the first clutch means as above described, but it will be obvious to those skilled in the art that the same mode of operation may be achieved, for example, by suitable spring means, if desired.

The above and other objects and advantages of my invention will appear from the detailed description.

Now in order to acquaint those skilled in the art with the manner of constructing and utilizing a transmission and control system therefor in accordance with my present invention, I shall describe in connection with the accompanying drawings a preferred embodiment of my invention.

In the drawings:

Figure 1 is a side elevational view of a transmission constructed in accordance with my present invention;

Figure 2 is an end elevational view, partly broken away, of the transmission of Figure 1 as viewed from the right hand end of the latter;

Figure 3 is a partial plan view taken substantially on the line 3—3 of Figure 1 looking in the direction indicated by arrows;

Figure 4 is a substantially vertical longitudinal sectional view taken substantially on line 4—4 of Figure 2 looking in the direction indicated by the arrows with certain parts being shown in elevation, and with the reverse gear means of the transmission being shown in dot and dash lines at the upper portion of the figure to illustrate the relation of the latter parts in the transmission;

Figure 5:
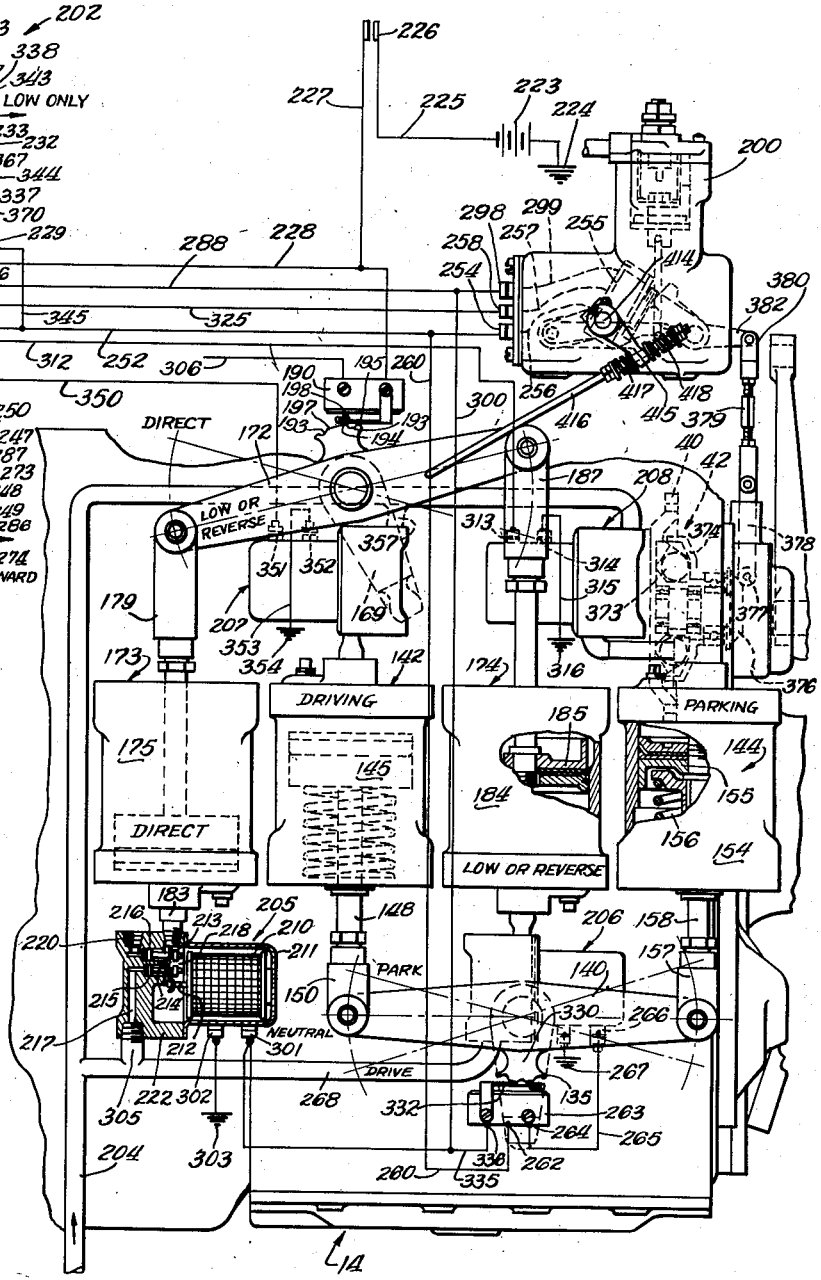
Figure 5 is a view largely schematic of the control system of my invention for the transmission shown in Figures 1 through 4 with certain of the parts of the transmission being re-arranged for convenience of illustrating the control system.

Figure 6 is a detail vertical sectional view with certain parts shown in elevation of an automatic control switch embodied in the control system of my invention providing for the automatic actuation of the transmission from one forward drive ratio to the other forward drive ratio in response to vehicle speed, driving range through the transmission, and intake manifold vacuum with the parts of the switch as shown in this figure being in the position they occupy with low vehicle speed, transmission in low range, and low intake manifold vacuum.

Figure 7 is a detail vertical sectional view taken on line 7—7 of Figure 6 looking in the direction indicated by the arrows;

Figure 8 is a detail horizontal sectional view taken on line 8—8 of Figure 6 looking in the direction indicated by the arrows;

Figure 9 is a partly broken away detail vertical sectional view of the automatic control switch of the control system of my invention along the lines of Figure 6, but showing the position of the parts of the switch at a fast vehicle speed, transmission in low range, and low intake manifold vacuum;

Figure 10 is a view corresponding to Figure 6 but showing the positions of the parts at a fast vehicle speed, and high intake manifold vacuum which initiates a shift in the transmission from low range forward to high range forward drive; and Figure 11 is a view along the lines of Figure 6 but partly broken away and showing the positions of the parts of the switch at a slow vehicle speed, transmission in high range and low intake manifold vacuum after a shift has been made in the transmission from low range forward drive to high range forward drive.

*Transmission construction, Figures 1 through 4*

The transmission of my invention in its preferred form as shown in the drawings comprises a fluid torque converter 10 and a change speed gear mechanism indicated generally at 12 with the torque converter 10 being contained within a housing 13 and the change speed mechanism 12 in a housing 14 with the housings 13 and 14 being suitably bolted in end to end relation as shown in Figure 4.

The torque converter 13 is of conventional construction and comprises an impeller housing 15 containing the usual form of impeller 16 and in which the section 17 of the housing section 15 is suitably keyed to a fly-wheel 18. It will be understood that the fly-wheel 18 has suitable connection with the crank shaft of a prime mover, such as an internal combustion engine, for a vehicle in which the transmission is embodied. The fly-wheel 18 is provided with a conventional form of starter ring 19 at the outer periphery thereof. The torque converter 10 also comprises a rotor or driven member 20 and a conventional form of stator 22. The rotor or driven member 20 has connection with a drive shaft 24 with the parts of the torque converter as is known providing for driving of the drive shaft 24.

As shown more clearly in the Figure 4 the drive shaft 24 extends through a pump housing 26 suitably secured in wall member 27 extending transversely between the adjacent open ends of the housing sections 13 and 14. The wall member 27 provides for the support of a ball bearing assembly 28 in which the adjacent end portion of the drive shaft 24 is journalled. A drive gear 29 is preferably formed integrally with and at the outer end of the drive shaft 24. A driven shaft 30 is journalled adjacent its inner reduced end in a roller bearing assembly 31 arranged between the inner end of the driven shaft 30 and the drive gear 29. The driven shaft 30 has connection in a conventional way with a parking brake assembly indicated generally at 32 with the driven shaft as is well understood being adapted to have connection with the drive or propeller shaft of a vehicle in which the transmission is assembled for driving the vehicle.

The driven shaft 30 has a low range or reverse driven gear 33 rotatably mounted upon an intermediate portion thereof about the needle bearing means 34 and ball bearing assembly 35. A gear 36 is keyed to the driven shaft 30 and is disposed between the ball bearing assembly 35 and the ball bearing assembly indicated at 38 with the latter ball bearing assembly being supported in a transverse wall member 39 of the housing section 14. The gear 36 as will later appear has meshing engagement with a gear 40 as shown in Figure 5 of a governor indicated generally at 42 in Figures 2 and 5.

A synchronizer clutch means indicated generally at 44 is arranged between the drive gear 29 and the driven shaft 30 of the transmission with the clutch means being operable in one engaged position thereof to clutch the drive gear 29 to the driven shaft 30 and in a second engaged position thereof to clutch the low range or reverse driven gear 33 to the driven shaft 30. The clutch 44 is of known construction and may be of the form disclosed in the application of Donald S. Dence, Serial No. 553,641, filed September 11, 1944, now Patent No. 2,412,203, issued December 10, 1946, or more preferably of the construction shown in my application Serial No. 666,663, filed May 2, 1946, now Patent No. 2,558,-656, issued June 26, 1951. The clutch means 44 comprises a body member 45 having splined connection as shown with a portion of driven shaft 30 between the inner end thereof journalled in the ball bearing assembly 31 and the low range or reverse driven gear 33. The body member 45 is restrained against axial movement on the driven shaft 30 by a pair of snap rings 46 one being disposed at each end of the body member 45. The body member 45 is provided with a plurality of axially directed peripheral slots 47 each of which is adapted to receive a clutch rocker member 48, only one of which is shown in the drawings. The inner edges of the rocker members are beveled to provide for rocking of the rocker arms radially about a central fulcrum 49. A suitable snap ring 50 locks the several rocker arms 48 against axial displacement within the slots provided therefor in the body member 45. The rocker arms 45 are adapted to be rocked to engage selectively the opposite ends thereof, forming jaw clutch teeth with the jaw clutch teeth 52 of the drive gear 29 or the jaw clutch teeth 53 of the low range or reverse driven gear 33, respectively, to provide for positively clutching the drive gear 29 and drive shaft 24 to the driven shaft 30 to effect direct drive in a forward direction through the change speed gear mechanism, or to positively clutch the low range or reverse driven gear 33 to the driven shaft 30 by axial shifting movement of the collar member indicated generally at 55. The collar member 55 is adapted to slide axially on the outer axially extending edges of the rocker members 48 into engagement with the outer ends of the rocker members 48 to rock the same about their fulcrums 49 to engage the opposite ends of the rocker arms 48 with either of the positive jaw clutch teeth 52 and 53 of the drive gear 29 and the low range or reverse driven gear 33, respectively. As disclosed in my above referred to application the side faces of the jaw clutch teeth formed by the opposite ends of the rocker arms 48 and the clutch teeth 52 and 53 are correspondingly tapered so that unless the opposite ends of the rocker arms 48 are positively held in engagement with the positive jaw clutch teeth 52 and 53 by means of the collar member 55 the torque between the teeth will expel the ends of the rocker members out of engagement with the clutch teeth 52 and 53 of the gears 29 and 33, respectively. The drive gear 29 is provided on the side face thereof facing the collar 55 with an annular cup-shaped member 57 which has an axially extending portion carrying a tapered synchronizer ring 58. The low or reverse driven gear 33 is likewise provided with an annular cup-shaped member 59 suitably secured at the side thereof facing the collar 55 and, like the member 57, carries a tapered synchronizer ring 60. A tubular member 62 is formed at its opposite ends with tapered friction surfaces 63 and 64 which are adapted to be engaged with, respectively, the correspondingly tapered friction surfaces of the synchronizer rings 58 and 60 of drive gear 29 and driven gear 33. The collar 55 and the tubular member 62 have a plurality of spring members 65, one of which is shown in Figure 4, therebetween which normally provide for positioning the collar 55 intermediate the ends of tubular member 62 and through which initial movement of the collar member 55 to the left as viewed in Figure 4 effects movement therewith of the tubular member 62 to engage the tapered friction surface 63 of the latter with the internal friction surface of the synchronizer ring 58 for synchronizing the gear 29 with the driven shaft 30 prior to positive engagement of the left hand ends of the rocker member 48 with the positive jaw clutch teeth 52 of the drive gear 29. The tubular member 62 is formed with blocking or lock-out notches 66 which together with the collar 55 form blocking or lock-out means of known construction in preventing shifting of the collar 55 relative to the tubular member 62 and against the detent means formed by the springs 65 until the tubular member 62 and the gear toward which the collar is moved are substantially in synchronism. Thus, upon shifting of the collar member to the left as viewed in Figure 4 to engage the tapered friction surface 63 of the tubular member 62 with the synchronizer ring 58 further axial shifting movement of the collar 55 is prevented until the driven shaft 30 and the drive gear 29 are in synchronism after which shifting of the collar member 55 to the left may be completed to engage positively the left hand ends of the rocker arms 48 with the positive jaw clutch teeth 52 of the drive gear to clutch the drive gear 29 to the driven shaft 30. Similarly upon initial shifting movement to the right of the collar member 55 from the left hand position thereof in which the drive gear 29 is positively clutched to the driven shaft 30 appropriate movement of the collar 55 to engage the tapered friction surface 64 of the tubular member 62 with the synchronizer ring 60 first brings the driven gear 33 into synchronism with the driven shaft 30. After the driven gear 33 and the driven shaft 30 are in synchronism the collar 55 may be further shifted to the right to engage positively the right hand ends of the rocker arms 48 with the jaw clutch teeth 53. In the transmission of my present invention the synchronizer clutch means 44 does not have a neutral position and as will presently appear as the description of my invention proceeds the collar 55 is shifted either to its far left hand position or far right hand position to clutch the drive gear 25 and driven shaft 30 together for conjoint rotation or for clutching the low range or reverse driven gear 33 to the driven shaft.

In the drawings the synchronizer clutch means 44 is shown in a neutral position for purposes of clearly disclosing the relation of the parts of the clutch with the drive gear 29 and the driven gear 33, but it will be understood as the description proceeds that the parts will only be in such position in the transition of a shift in the transmission from one gear ratio or drive to a second gear ratio or drive or vice versa in the change speed gear mechanism. With the clutch 44 engaged in one position in which the clutch collar 55 is in its left hand position as viewed in Figure 4 the drive and driven shafts are connected together to provide for direct drive or high range in a forward direction between the drive and driven shafts; and when the clutch collar 55 is disposed in its right hand position as viewed in this figure the driven low range or reverse gear 33 is clutched to the driven shaft 30 and in which position of the clutch either low speed high ratio drive or low range in a forward direction is provided between the drive and driven shafts, or reverse drive is provided for between the drive and driven shafts through gear means to be presently described.

As shown in Figure 4 a first or low range gear means 70 is provided and which gear means 70 comprises a first countershaft 72 suitably journalled for rotation at its opposite ends in bearing assemblies indicated generally at 73 and 74 in the change speed gear mechanism housing 14. A gear 74 is keyed to the first countershaft 72 as indicated at 76, and the gear 75 as shown has constant meshing engagement with the drive gear 29. A gear 77 is rotatably mounted about the first countershaft 72 as by means of needle bearing means 78 with the gear 77 having constant meshing engagement with the low range or reverse driven gear 33. The gear 77 is restrained against movement axially on the first countershaft 72 by a snap ring 80 and a thrust washer 82 disposed between the outer end face of gear 77 and the bearing assembly 74. A forward drive clutch means indicated generally at 84 is arranged between the first countershaft 72 and the freely rotatable gear 77 with the clutch means 84 comprising a dental clutch collar 85 having splined axially sliding connection with the intermediate portion of the first countershaft 72 between the gears 75 and 77 thereof. The clutch collar 85, as shown, is provided with a plurality of clutch teeth 86 which are adapted to have meshing engagement with clutch teeth 87 of the gear 77 for clutching the gear 77 to the first countershaft 72. Spring detent means including a spring loaded ball 88 adapted to engage in suitably formed notches in clutch collar 85 is provided for yieldingly maintaining the latter either in a position in which the clutch teeth 86 thereof are engaged with the clutch 87 of the gear 77 or in a position in which these clutch teeth are disengaged. In Figure 4 the clutch collar 85 is shown in position in which the jaw clutch teeth 86 thereof are in engagement with the jaw clutch teeth 87 of the gear 77 so that the gear 77 is in driving relation with respect of the driven gear 33. Upon engagement of the synchronizer clutch means 44 to clutch the driven gear 33 to the driven shaft 30 it will be observed that a second forward drive ratio or low range is adapted to be imparted to the driven shaft 30 from drive shaft 24 through gears 29 and 75, the countershaft 72 and through gear 77 to the gear 33 and which when the clutches last noted are engaged as described provides through the gear ratios of the gears referred to for low range drive in the forward direction between the drive and driven shafts.

The transmission also includes a reverse drive gear means 92 comprising a second countershaft or reverse idler shaft 90 shown in dot dash lines in Figure 4 which shaft is suitably mounted for rotation in the change speed gear mechanism housing 14 by bearing means of like construction as described in connection with the first countershaft 72. The second countershaft 90 has a gear 93 suitably keyed thereto and the gear 93 has constant meshing engagement with the gear 75 keyed to the first countershaft 72. A reverse gear 94 is rotatably mounted on the shaft 90 and is restrained against axial movement thereon as described in connection with the gear 77 of the first countershaft 72. The gear 94 has constant meshing engagement with the driven gear 33. A clutch collar 95 of reverse drive clutch means 96 is splined for sliding axial movement on the second countershaft 90 and is formed with jaw clutch teeth 96' which are adapted to have clutching engagement with jaw clutch teeth 97 of the reverse gear 94. The arrangement is such that with the forward drive clutch means 84 disengaged and with the reverse drive clutch means 96 engaged, i. e. with the collar 95 shifted to the right as viewed in Figure 4 to engage jaw clutch teeth 96' with the jaw clutch teeth 97 to clutch gear 94 to the second countershaft 90, the drive through the transmission is from the drive gear 29 to the gear 75 and from the latter to the gear 93 through second countershaft 90 to gear 94 to driven gear 33. If the synchronizer clutch means 44 is in position clutching the driven gear to the driven shaft 30 reverse drive in low range is caused to be imparted to the driven shaft 30 through the second gear as described.

The change speed gear mechanism 12 described thus provides an arrangement in which direct drive or high range may be affected therethrough by shifting of the synchronizer clutch means 44 to the left as viewed in Figure 4 to clutch the driven and drive shafts together. Low range forward drive between the drive and driven shafts may be effected by actuation of the synchronizer clutch means 44 to clutch the driven gear 33 to the driven shaft 30 and to shift the clutch collar 85 of the forward clutch means 84 to the right to clutch gear 77 to the first countershaft 72. Reverse drive in low range is effected between the drive and the driven shafts by disengaging the forward clutch means 84 and engaging the reverse clutch means 96 to clutch gear 94 to the second countershaft or reverse idler shaft 90 with the synchronizer clutch means 44 in its engaged position in which the driven low range or reverse gear 33 is clutched to the driven shaft 30.

In all of the above described positions of the several clutches it will be observed that infinitely variable multiplication is provided by means of the fluid torque converted unit 10 from the drive shaft 24 thereof to the driven shaft 30 of the transmission.

Referring now to Figures 2 and 4 it will be seen that the clutch collars 85 and 95 are formed with annular grooves 98 and 98', respectively, within which shaft forks 99 and 100 fit, respectively.

The forks 99 and 100 are pivotally mounted in bearings 102 and 103 respectively at opposite ends of a shift lever 132 pivotally mounted on a stud 133 supported in a suitable bearing in the lower end of the change speed gear mechanism housing 14. A crank arm 135 is formed with a ball shaped end portion 136 fitting in an opening at the outer end of the lever member 132 adjacent the pivotal mounting of the fork 100. The crank arm has connection with a shaft 137 extending laterally through the side of the housing section 14 through the bearing housing portion 138 thereof, and which shaft member 137 has secured at its end external of housing section 14 a range shift lever 140.

As best shown in Figure 1 a pair of piston and cylinder means indicated generally at 142 and 144 which are hereinafter referred to respectively as "driving" and "parking" and with the cylinders of these devices in Figures 1, 2, and 5 also bearing the identifying legends "driving" and "parking," are provided for effecting rocking of the range shift lever 140 from its neutral position, shown in Figure 1, to effect engagement of the low range forward drive clutch means 84 and disengagement of reverse drive clutch means 90, or vice versa.

The driving piston and cylinder means 142 comprises a cylinder 145 within which a piston 146 is disposed. The cylinder 145 is mounted exteriorly of the housing section 14 by an angle bracket member 147. A connecting rod 148 has connection with the piston 146 at one end and at its other end is provided with a clevis 150 for pivotally connecting the same to one end of the range shift lever 140 as at 152. A coil spring 153 is arranged between the piston 146 and the bottom end wall of cylinder 145.

The parking piston and cylinder means 144 is of the same construction as the driving piston and cylinder means 142 and comprises a cylinder 154, a piston 155 and a coil spring 156. A clevis 157 at the outer end of a connecting rod 158 secured at its other end to piston 155 has pivotal connection to the other end of the range shift lever 140 as at 160. The coil springs 153 and 156 of the driving and parking piston and cylinder means 142 and 144 normally tend to position the range shift lever 140 in its neutral position shown in Figure 1, and in which position of the range shift lever 140 the clutch collars 85 and 95 are disposed in position axially on the first and second countershafts in which the jaw clutch teeth of the clutch collar members are out of engagement respectively with the clutch teeth 87 of the gear 77 and the clutch teeth 97 of the gear 94.

An air hose or conduit 162 has connection with cylinder 145 and a like air hose or conduit 163 has connection with the cylinder 154. Upon admission of air under pressure through conduit 162 to the driving piston and cylinder means 142 the piston 146 is urged downwardly as viewed in Figure 1 and this movement of the piston through the connecting rod 148 rotates the range shift lever 140 from its neutral position shown in the latter figure in a counterclockwise direction. This movement of the range shift lever 140 rotates the shaft 137 to rock crank arm 135 and through the connection of the latter with the lever 132 effects axial movement of clutch collar 85 to engage the clutch teeth 86 thereof with the clutch teeth 87 of gear 77. When the driving piston and cylinder means 142 is thus energized it will be observed that one or the other of the two forward drive ratios may be selectively effected through the change speed gear mechanism by shifting of the collar 55 of the clutch means 44 to either of its aforedescribed engaged positions providing in one position for forward direct drive or high range through the change speed gear mechanism 12 and in a second position for low range forward drive between the drive and driven shafts 24 and 30.

Upon admission of air under pressure through the conduit 163 to the parking piston and cylinder means 144 the piston 155 is forced downwardly against spring 156 and through connecting rod 158 rocks the range shift lever 140 in a clockwise direction as viewed in Figure 1 and which movement of the range shift lever 140 through shaft 137 and crank arm 135 rotates lever 132 to effect through shift fork 99 axial movement of the clutch collar 85 to disengage the clutch teeth 86 and 87, and upon continued movement of the range shift lever in its clockwise direction beyond its neutral position shown in Figure 1 to effect through shift fork 100 axial movement of clutch collar 95 to engage the clutch teeth 96 thereof with the clutch teeth 97 of the gear 94. In this position of the parts actuation of synchronizer clutch means 44 to clutch the drive and driven shafts together provides for forward drive between the drive and driven shafts, and actuation of the clutch means 44 to its other position in which the driven low range or reverse gear 33 is clutched to the driven shaft 30, provides for reverse drive between the drive and driven shafts through the reverse drive gear means already described.

It will thus be observed that by the selective control of admission of air under pressure into the driving and parking piston and cylinder means 142 and 144, respectively, that the transmission may be conditioned for selective actuation providing one or two forward drive ratios between the drive and driven shafts of the transmission, or the selective actuation of the transmission to provide for one forward drive ratio and reverse drive by actuation of the synchronizer clutch means 44. In the description of my invention hereinafter and more particularly as it concerns the control means of my instant invention the condition provided by admission of air under pressure through conduit 162 to the driving piston and cylinder means 142 is referred to as the driving range, and the condition in which air under pressure is admitted through conduit 163 to the parking piston and cylinder means 144 is referred to as the parking range.

Referring now more particularly to Figure 2 it will be seen that the transmission further comprises a shift fork 165 which is adapted to engage the collar 55 of the clutch means 44 to move the same axially to the left and to the right as viewed in Figure 4. The shift fork 165 is mounted for axial movement on a guide rail 166 and the shift fork is formed with a socket member 167 in which the ball shaped end portion 168 of a crank arm 169 is disposed. The crank arm 169 is secured to the lower end of a vertically extending shaft 170, and which shaft 170, as best shown in Figure 3, at its upper end has one end of a synchronizer shaft lever 172 secured thereto.

A second pair of piston and cylinder means indicated generally at 173 and 174, hereinafter designated as the "direct drive" and "low or reverse" piston and cylinder means, respectively, are provided for selectively actuating synchronizer clutch means 44 to effect high range or direct drive between drive shaft 24 and driven shaft 30 in the forward direction, or to clutch driven low range or reverse gear 33 to the driven shaft 30 to condition the transmission for either reverse drive or forward low range drive between the drive and driven shafts. In Figures 1, 2 and 5 of the drawings, the piston and cylinder means 173 and 174 bear legends identifying them as aforesaid. Referring now more particularly to Figures 2 and 3, it will be seen that the direct drive piston and cylinder means 173 comprises a cylinder 175 mounted on the housing section 14, with its axis disposed horizontally, by means of a suitable angle bracket 177. A piston 178 is disposed in the cylinder 175. A connecting rod 179 is connected at one end to the piston and at its other end through a clevis 180 has pivotal connection, as at 182, to the synchronizer shift lever 172. A conduit or air hose 183 has connection with cylinder 175 and upon admission of air under pressure to cylinder 175 the piston is moved inwardly of the cylinder and through connecting rod 179 rotates the synchronizer shift lever 172 and shaft 170 in a clockwise direction as viewed in Figure 3. Upon such rotation of shaft 170 the crank arm 169 effects axial movement of shift fork 165 in a direction to axially shift the collar 55 of synchronizer clutch means 44, as viewed in Figure 4, to the left to clutch the drive and driven shafts together for direct or high range forward drive.

The low or reverse piston and cylinder means 174 comprises a cylinder 184 mounted on housing section 12 by suitable bracket means (not shown) so that it lies with its axis disposed horizontally, in opposed relation of cylinder 175 and on the opposite side of the free end of synchronizer shift lever 172. A piston 185 is disposed within the cylinder 184 and a connecting rod 186 connected at one end to the piston 185 has pivotal connection adjacent its opposite end, with the synchronizer shift lever 172 by means of the clevis 187. An air hose or conduit 189 has connection with cylinder 185 for admitting air under pressure thereto. Upon the admission of air under pressure through the conduit 189 to the cylinder 184 the synchronizer shift lever 172, as viewed in Figure 3, is rotated in a counter-clockwise direction and through shaft 170 and crank arm 169 shifts the shift fork 165 axially in a direction to move collar 55 of clutch means 44 to the right as viewed in Figure 4 to clutch the driven low range or reverse gear 33 to the driven shaft 30 which as previously described when the clutch 44 is actuated in this manner provides for either low range forward or reverse drive between the drive and driven shafts, or for providing a neutral for the transmission depending upon the positions of clutch collars 85 and 95 of the forward and reverse clutch means 84 and 86. It will be observed that return springs are not required for either of the piston and cylinders means 173 and 174 in that synchronizer clutch means 44 remains engaged in either selected position, with the neutral for the transmission being provided by disposing of the clutch collars 85 and 95 in disengaged positions.

As shown in Figures 1 and 3, a single pole single throw microswitch 190 is supported on the torque converter housing section 13 adjacent the outer or free end of the synchronizer shift lever 172. As will presently be referred to in greater detail, the microswitch 190 is in circuit with the storage battery for the vehicle and the low voltage spark circuit of the ignition system for the prime mover of the vehicle with the synchronizer shift lever 172 in either of its shifted positions having end notches 193 receiving the projection 194 on the spring switch arm 195 of the microswitch for closing the latter to complete the low voltage circuit of the ignition system for the engine. Upon movement of the synchronizer shift lever 172 from its low range end position towards its high range end position the cam surface 197 between the notches 193 engage the projection 194 and bias the spring switch arm 195 inwardly to engage the actuator member 198 of the microswitch to open the switch. This interruption of the low voltage spark circuit avoids actuation of the synchronizer clutch means 44 against the engine power and will allow the engine to slow down so as to synchronize with the speed of the transmission driven shaft 30 which is then turning at the speed resulting from the low range drive. At the completion of this shift contact knob 194 will drop into an end notch 193 and turn the engine ignition back on to re-establish the engine's driving power. The movement of lever 172 in the other direction deflects spring 195 off switch actuation plunger 198 and therefore does not cut the engine's ignition and the release of the direct drive allows the engine to accelerate, since it then does not have to exert its power to propel the vehicle, until its speed causes the low range gear 33 to run at synchronous speed with shaft 30 and the shift is then completed without clash. The other end notch 193 then allows spring 195 to assume its normal position.

An automatic control switch indicated generally at 200 as shown in Figures 1 and 2 is supported on the housing section 14 with this automatic control switch as will hereinafter appear providing for automatic operation of the transmission in effecting shifting of the synchronizer clutch means 44 to effect either high range or direct forward drive between the drive and driven shafts, or low range forward drive between the drive and driven shafts in response to the intake manifold vacuum of the prime mover for the vehicle and the speed of the vehicles as well as which forward driving range is then being used.

Control system of Figure 5

In Figure 5 certain parts of the transmission above described are shown diagrammatically with the geographical relationship of such parts being re-arranged for the convenient illustration and description of the control system of my present invention for the above described transmission. The control system of my invention, comprises a manually operable master control switch 202 which may be mounted under the steering wheel of the vehicle convenient to the operator, and has a shift lever 203 which is shiftable upwardly, for example, to parking range position, and downwardly to driving range position. When the switch lever 202 is in parking range position it may be rotated in opposite directions from its neutral position shown in Figure 5 to effect upon movement in one direction forward high range or direct drive between the drive and driven shafts; and upon movement in the other direction to effect reverse drive between the drive and driven shafts. When the switch lever 203 is raised to driving range position it is rotatable in opposite directions from neutral position with movement of the lever in one direction from neutral position providing for effecting forward drive between the drive and driven shafts in low range through the change speed gear mechanism, and upon rotation of the lever in the opposite direction providing for automatic control of the change speed gear mechanism for effecting shifting from forward high range or direct drive to low range forward drive, or vice versa, in response to engine intake manifold vacuum, vehicle speed under the control of the throttle of the engine and also being influenced by which driving range is then being used.

The several legends and arrows indicating direction of movement of shift lever 203 for effecting the above several conditions are shown on Figure 5.

A manifold 204 through which air under pressure is adapted to be conveyed to the several piston and cylinder means already described has connection with a source of air under pressure carried by the vehicle. For example, a compressor (not shown) driven in any suitable manner may be provided for delivering air under pressure to an air storage tank (not shown) to which the manifold 204 has connection.

The manifold 204 has branches extending to a plurality of solenoid valve means 205, 206, 207, 208 associated one each with cylinders 175, 184, 145, and 154, respectively. The several solenoid valves are all of like and known construction in view of which solenoid valve means 205 only shall be described in brief detail with it being understood that other devices serving the same purpose may be used if desired. The solenoid valve means 205 as shown comprises a coil 210 enclosed within a housing 211. A plunger 212 adapted to be drawn inwardly of coil 210 upon energization of the latter has connection to one end of a valve actuator member 213 pivoted intermediate its end as at 214. The valve actuator member 213 has connection with an intake valve 215 and an outlet or relief valve 126. The arrangement is such so that upon energization of coil 210 movement of the plunger 212 effects rocking movement of the valve actuator member 213 to open the intake valve 215 to admit air under pressure from the manifold 204 through the intake passageway 217 past valve 215 into valve chamber 218 and then into the conduit 183 of cylinder 175 for shifting the piston 178 therein. Upon de-energization of coil 210 the intake valve 215 is closed and the outlet or relief valve 216 is caused to be opened by the valve actuator member 213 so that air under pressure in cylinder 175 is bled through the valve housing and discharged through vent outlet 220. Valve body 222 in which the aforesaid inlet and outlet passageways and inlet and discharge valves are arranged is suitably secured to the housing 211 for the coil 210 to provide an integral unit which may be conveniently connected with piston and cylinder means 173.

The storage battery 223 for the vehicle which provides a source of electricity for actuation of the several solenoid valves has one terminal grounded as at 224 to the frame or chassis of the vehicle. A lead 225 extends from the other terminal of the battery to the ignition switch 226 and a lead 227 from the ignition switch 226 has connection with a lead 228 extending to the master manual control switch 202 and to the microswitch 190.

*Control system—transmission in neutral—Figure 5*

The control system with the master control switch 202 in neutral position shown in Figure 5 provides a neutral for the transmission. In the latter position of switch 202 it will be seen that a lead 229 connects lead 228 with a spring contact finger 230 having a contact 232 in engagement with a contact 233 of a spring contact finger 234 connected by lead 235 with spring contact finger 236 having a contact 237 in engagement with a contact 238 carried by a spring contact finger 239 with a spring contact finger 242 having a contact 243 in engagement with a contact 244 carried by spring contact 245. A lead 246 connects spring contact finger 245 with a spring contact finger 247 having a contact 248 in engagement with a contact 249 of a spring contact finger 250. A lead 252 extends from the spring contact finger 250 to a terminal 254 of the automatic control switch 200. A microswitch 255 has connection by means of a lead 256 with the terminal 254. The microswitch 255 is of the single pole double throw type and in its normal position provides for closing of a circuit between the lead 256 and a lead 257 extending from the central or common terminal of the switch and having connection with the terminal 258 of the automatic control switch 200. However, as will be described in greater detail hereafter, in the position of the manual control switch 202 shown in Figure 5 a circuit is not completed through the microswitch 255 between the terminals 254 and 258. Anterior of the terminal 254 a lead 260 has connection with the lead 252 with the lead 260 extending to a central or common terminal 262 of a double throw single pole microswitch 263. The microswitch 263 in its normally closed position in Figure 5 completes a circuit between terminals 262 and 264 thereof. A lead 265 extends from terminal 264 and has connection with terminal 266 of the solenoid valve means 206. The other terminal of the solenoid valve 206 is grounded as indicated at 267 completing a circuit through the frame or chassis of the vehicle with the ground 224 of the storage battery 223, so that with the microswitch 263 in its normally closed position the coil of the solenoid valve means 206 is energized. Thus air under pressure from manifold 204 passes through branch 268 and solenoid valve means 206 to cylinder 184 of the piston and cylinder means 174 which effects movement of the piston 185 and rotates the synchronizer shift lever 172 to a position in which the crank arm 169 actuates synchronizer clutch means 44 to clutch the low or reverse driven gear 33 to the driven shaft 30. As will presently appear as the description of the control system proceeds the solenoid valves 207 and 208 are deenergized so that the range shift lever 140 is disposed in its neutral position as shown in Figure 5 and in which position the crank arm 135 disposes clutch collars 85 and 95 of the forward and reverse clutches 84 and 96 in disengaged or neutral position to provide a neutral for the transmission.

*Control system—parking range—forward drive*

To effect the above condition the shift lever 203 is disposed in parking range and when in this position and rotated clockwise as viewed in the drawing it will be seen that the roller 270 engages the cam surface 272 of a spring contact finger 273 which has connection by a stem 274 of insulating material with the spring finger 250 to effect separation of contacts 248 and 249 to open the normally closed circuit through the microswitch 263 deenergizing the electric solenoid valve 206 so that the air under pressure in cylinder 184 is relieved. In the aforesaid movement of the switch lever 203 the roller 285 carried thereby is withdrawn from engagement with the spring contact finger 276. The spring contact fingers 276 and 242 are connected together for conjoint movement by stem 278 of insulating material initially prestressed so that when thus released they, as viewed in Figure 5, move to the left. Contacts 243 and 244 carried by spring fingers 242 and 245 remain in contact with each other but it will be observed as previously noted that the circuit through the lead 252 is broken by separation of contacts 248 and 249. With the manual control switch 202 in the position last noted, connection is made from the main battery lead 228, through lead 280, through lead 282 having connection with spring contact finger 273 and through contact 284 carried thereby in engagement with contact 286 carried by spring contact finger 287 from which lead 288 extends to terminal 298 of the automatic control switch 200. A lead 299 extends from terminal 298 to the third terminal of the microswitch 255 with the circuit between terminals 258 and 298 as will hereinafter appear being normally open in the automatic operation for forward drive through the transmission. A lead 300 has connection with lead 288 ahead of terminal 298 and extends to the terminal 301 of solenoid valve means 205 to complete a circuit through the coil 210 thereof with battery 223 through terminal 302 having connection to ground as indicated at 303. Energization of the solenoid valve 205 in the manner described provides for admission of air under pressure through the branch 305 of branch 268 to the direct drive piston and cylinder means 173 which is effective to rock the synchronizer shift lever 172 in a clockwise direction as viewed in Figure 5 and through crank arm 169 effects engagement of synchronizer clutch means 44 to clutch the drive and driven shafts together. Movement of the synchronizer shift lever 172 as before noted through the cam surface 197 thereof effects opening of the circuit between lead 227 and lead 306 extending to the low voltage coil of the spark circuit while the synchronized clutch means 44 is being shifted from low range engaged position to its high range engaged position so that this shift is made without having to work against the engine power of the prime mover for the vehicle.

Further, it will be observed, that the lead 280 has connection with a spring contact finger 276 carrying contact 307 which is in engagement with contact 308 of a spring contact finger 310 from which a lead 312 extends to terminal 313 of the solenoid valve means 208 and through the coil of the solenoid valve means to a terminal 314 which is connected by a lead 315 to ground as at 316.

Upon completion of a circuit through the solenoid valve means 208 air under pressure from the manifold 204 is admitted to parking piston and cylinder means 144 urging the piston 155 downwardly as viewed in the drawing against the force of spring 156 to rock the range shift lever 140 in a clockwise direction and through crank arm 135 engages reverse clutch means 96 to clutch gear 94 to the reverse idler shaft 90. Reverse drive however is not effected between the drive and driven shafts in that clutch means 44 is engaged to effect clutching of the drive and driven shaft for direct drive together and to disengage the driven gear 33 from the driven shaft 30. Also as will subsequently appear in the further description of the control system the automatic control switch 200 is not in circuit with the battery so that the vehicle in parking range forward is adapted to be driven in a forward direction in direct drive through the change speed gear mechanism under control of the throttle of the vehicle by the operator.

*Control system—parking range—reverse drive*

Assuming again that the control system is as shown in Figure 5 of the drawing it will be observed that when the switch lever 203 is disposed in parking range and rotated in a counterclockwise direction that the spring contact finger 276 will be urged to the left by engagement of rollers 285 with the end thereof. The spring contact fingers 273 and 250, interconnected by the insulating stem 274, are prestressed so that when released they will move as a unit to the left as viewed in the drawings. With the switch lever disposed in its last described position it will be seen that contacts 243 and 244 carried by spring contact fingers 242 and 245 respectively, will be separated opening the circuit between the main battery lead 228 and lead 252 which is effective to deenergize solenoid valve means 206. However, the solenoid valve means 206 for the low or reverse piston and cylinder means 174 is only momentarily deenergized in that a circuit will be completed from the main battery lead 228 to lead 280 to spring contact finger 276 carrying contact 320 which is now in engagement with contact 322 carried by spring contact finger 323 from which a lead 324 extends to a lead 325 connected to terminal 258 of the automatic control switch 200. The lead 257 connects terminal 258 to the microswitch 255 from which lead 256 extends to terminal 254. Lead 252 connected to lead 260 extends to microswitch 263 which is in normally closed position so that the solenoid 206 is energized whereby air under pressure is admitted into low or reverse piston and cylinder means 174. As previously noted when the latter piston and cylinder means has air under pressure admitted thereto the synchronizer shift lever 172 is disposed in a position in which reverse clutch means 96 is engaged. Also it will be seen that the connection is established from the main battery conduit 228 through lead 280, through lead 282 to spring contact finger 273 and contact 326 which is carried thereby now having engagement with contact 327 carried by spring contact 328 from which a lead 329 extends to lead 312 which as before noted extends to solenoid valve means 208 of the parking piston and cylinder means 144 whereby the range shift lever 140 is rocked in a counterclockwise direction and through crank arm engages reverse clutch means 96 providing for reverse drive between the drive and driven shafts. Upon rocking of the range shift lever 140 from its neutral position as shown in Figure 5 to the dot dash line position identified by the word "park" it will be observed that a cam 330 engages the switch spring arm 332 of the microswitch 263 for actuating the latter to open the normally closed circuit between the leads 260 and 265 for energizing the solenoid valve means 206 to complete a circuit between the central terminal 262 of the solenoid switch with a lead 335 connected with the normally open terminal 336 of the microswitch 263 so as to complete a circuit therethrough to the solenoid valve means 205 for admitting air under pressure into the direct drive piston and cylinder means 173. Upon completion of movement of the range shift lever 140 to its park position the switch spring arm 332 of the microswitch 253 is released so that the microswitch 263 assumes its normally closed position in which the solenoid valve means 205 is deenergized and the solenoid valve means 206 reenergized. This movement of the range shift lever is thus effective for opening and then closing the circuit through the solenoid valve means 206 for the low or reverse piston and cylinder means 174 and closing and then opening the circuit through solenoid valve means 205 for the direct drive piston and cylinder means 173. The momentary closing and opening of solenoid valve means 205 actuates synchronizer clutch means 44 to clutch the drive and driven shafts together momentarily and in this manner stop any gear rotation due to the engine and removing all torque from the rotatable driven gear 33 whereby the reverse gear clutch means 96 may be engaged without clashing of the clutch teeth thereof with the clutch teeth of the gear 94.

*Control system—driving range—forward drive in low only*

With the manual shift lever 203 disposed in driving range position and upon rotation thereof in counterclockwise direction as viewed in Figure 5 a roller 336 engages the extension of a spring contact finger 337 which is connected to spring contact finger 229 by means of a stem 338 of insulating material. Also a roller 339 releases the extending portion of a spring contact finger 340 which has connection with spring contact finger 239 by means of a stem of insulating material 342. The spring contact fingers 239 and 340 are prestressed so that when thus released they move together to the right. Upon movement of the lever 203 in the manner noted contacts 232 and 233 are caused to be separated from each other which is effective to open the circuit therethrough between the main battery lead 228 and lead 252. However, upon opening of the latter circuit a circuit to the solenoid valve means 206 is caused to be closed through the main battery lead 228 spring contact finger 337 to contact 342 thereof which is in engagement with contact 343 carried by spring contact finger 344 and from which a lead 345 extends to the lead 252 through lead 260 to the normally closed micro-switch 263 to energize the solenoid valve means 206 so that air under pressure is admitted to the low or reverse piston and cylinder means 174. Also in the last noted position of the shift lever 203 it will be observed that the solenoid valve means 207 is caused to be energized by completion of a circuit from main battery lead 228 to lead 280 having connection with spring contact finger 340 carrying contact 346 which is now in engagement with contact 347 of a spring contact finger 348 from which a lead 350 extends to a terminal 351 of the solenoid valve means 207 through the coil thereof and to a terminal 352 connected by lead 353 to ground 354. Energization of solenoid valve means 207 provides for admission of air under pressure from manifold 204 through branch conduit 357 to the driving piston and cylinder means 142 which is effective to rock the range shift lever 140 and through crank arm 135 effect engagement of the low range forward clutch means 84 to clutch gear 77 to the countershaft 72. Upon movement of the range shift lever 140 from its neutral position shown in the drawing to its "drive" position indicated by the dot dash lines it will be observed that the cam 330 is effective for opening the normally closed circuit through the micro-switch 263 to the solenoid valve means 205 and close the circuit through lead 335 to the solenoid valve means 205 which is operative as before to actuate clutch means 44 for disengaging driven gear 33 from driven shaft 30 and to clutch the driven shaft 30 to the drive shaft 24 to stop all gear rotation while the forward dental clutch means 84 is caused to be engaged followed by reengagement of the clutch means 44 by reclosing of microswitch 263 to its normally closed position to clutch the driven gear 33 to the driven shaft 30 so that with the clutch means 44 in the latter position the forward ratio clutch means 84 is engaged for low range forward drive through the change speed gear mechanism. Upon completion of this shift forward drive of the vehicle in low range is under control of the throttle of the vehicle by the operator. It will be observed that in the above described circuit caused to be completed by movement of the shift lever 203 that the automatic control switch 200 is out of circuit with the battery 223 so that the transmission will be maintained for operation with the clutches 44 and 84 engaged in the manner last noted.

*Control system—driving range—automatic forward drive*

For the above condition of operation of the transmission the switch lever 203 is adapted when disposed in driving range position to be rotated in a clockwise direction as viewed in Figure 5 which movement through roller 339 flexes spring contact finger 340 to the left and through insulating stem 342 effects movement of spring contact finger 239 to the left with the movement of the latter causing separation of contacts 237 and 238 to open a circuit between the main battery lead 228 and lead 252 to terminal 254 of the automatic control switch 200. The circuit through contacts 237 and 238 through lead 252 and lead 260 to microswitch 263 to the solenoid valve means 206 is thus opened. However, it will be seen that contact 362 carried by spring contact 340 is in engagement with a contact 363 carried by spring contact 364 to which lead 324 has connection. Lead 325 extending from lead 324 has connection with terminal 253 of the automatic control switch 200. Switch lead 257 connects terminal 258 with one terminal of the microswitch 255 which in its normally closed position through switch lead 256 extends to terminal 254 which has connection by leads 252 and 260 with the terminal 262 of microswitch 263. With the microswitch 263 in its normally closed position a circuit is completed through lead 265 to the solenoid valve means 206 to admit air under pressure to the low or reverse piston and cylinder means 174 to maintain the synchronizer shift lever 172 in the position shown in Figure 5. The crank arm 169 is thus retained in position to effect actuation of clutch means 44 to clutch the low range or reverse driven gear 33 to driven shaft 30. Movement of the lever 203 to driving range automatic position also releases the prestressed spring contact fingers 337 and 230 connected together by insulating stem 338 for movement to the left as viewed in Figure 5 with movement of spring contact finger 337 as noted providing for completion of a circuit from the main battery conduit 228 to lead 366 extending to spring contact finger 337 through the contact 367 carried thereby which is in engagement with a contact 368 carried by a spring contact finger 370 from which a lead 372 extends to lead 350 to complete a circuit through the solenoid valve means 207. The solenoid valve means 207 when energized admits air under pressure to the driving piston and cylinder means 142 to effect rotation of the range shift lever 140 in a counterclockwise direction to dispose the same in the "drive" position indicated by the dot-dash lines in the drawings. This movement of the range shift lever 140 through the crank arm 135 effects engagement of the low forward clutch means 84 and the disengagement of the reverse clutch means 96. Further, in this movement of the range shift lever 140 the cam 330 first opens the circuit to the solenoid valve means 206 and closes the circuit to the solenoid valve means 205 between the normally opened terminals 262 and 336 of microswitch 263 so that the synchronizer shift lever 172 is caused to be rotated in a direction to disengage synchronizer clutch means 44 from driven gear 33 and to clutch the driven shaft 30 to the drive shaft 24 to brake rotation of the gear means so that the forward drive clutch means 84 may be engaged without clashing of the clutch teeth thereof and of gear 77. Also, this movement of the synchronizer shift lever 172 actuates the microswitch 190 to interrupt the low voltage spark circuit for the prime mover of the vehicle so that the shift is not made against the power of the engine. Upon completion of the movement of the range shift lever to its drive position the normally closed circuit through the microswitch 263 to solenoid valve means 206 will be established so that the synchronizer shift lever 172 is returned to the position shown in Figure 5. The shift is thus completed and the transmission is now conditioned for effecting a low range forward drive between the drive and driven shafts under the control of the throttle of the engine by the operator of the vehicle.

As previously noted upon actuation of the manual shift lever 203 to driving range automatic position actuation of synchronizer clutch means 44 to effect a change in gear ratio through the change speed gear mechanism from low range to direct drive or high range is under the control of the throttle for the vehicle, the intake manifold vacuum, vehicle speed and the driving range then being used.

The governor 42 previously referred to may be of any suitable known form and as shown in Figure 5 comprises a plurality of balls 373 arranged between the gear 40 having meshing engagement with gear 36 keyed to the driven shaft 30 and an axially shiftable member 374. The governor 42 is responsive to the speed of rotation of the driven shaft 30 and consequently of the forward speed of the vehicle. When the governor balls 373 are thrown radially outwardly by centrifugal force into engagement with the member 374 the latter and cam member 376 are shifted axially to the right as viewed in Figure 5. The cam member 376 is adapted to engage a roller 377 carried at one end of a rod 378 which has connection by means of an adjustable turn buckle 379 with a clevis 380 connected to the end of a crank arm 382 of the automatic control switch 200. Thus at a predetermined vehicle speed governor 42 is adapted to effect movement of the rod 378 and crank arm 382 of the automatic control switch 200 in a counterclockwise direction as viewed in Figure 5.

The automatic control switch 200 as shown in Figures 5 through 7 comprises in addition to the parts previously referred to a switch actuator member 383 connected to a shaft 384 to which the crank arm 382 is suitably secured with the shaft 384 having a reduced cylindrical end portion 385 journalled in a boss 386 of the automatic switch housing 387. The switch actuator member 383 is provided with a projection 388 which engages a spring loaded button member 389 mounted in a bore 393 in a boss 390. A coil spring 392 is disposed in the bore 393 and provides for disposing the switch actuator member 383 in its normal position shown in Figure 6. In response to governor 42 the crank arm 382 is adapted to be rotated in a counterclockwise direction as viewed in Figure 6 and which movement of the shaft 384 carrying the switch actuator member 383 is effected to rotate the same against the force of spring 392 in position to trip microswitch 255 in a manner to be described.

The housing 387 is closed at its upper end by a suitable cap member 395 which is provided with a tapped inlet opening 396 having connection with the intake manifold of the prime mover for the vehicle in which the transmission and controlled system is installed. The housing 387 is further provided with a neck portion forming a cylinder 398 in which a piston 399 is disposed for vertical movement. A coil spring 400 disposed between the cap member 395 and the piston 399 normally tends to bias the piston downwardly in the cylinder 398 formed by the housing 387. A gland assembly 402 is threaded in the cap member 395 and carries a plunger 404 which is normally biased downwardly by a coil spring 405 and against which plunger in the operation of the automatic control switch 200 as will be described is adapted to be engaged by the pin member 406 carried by piston 399 so that under medium engine vacuum condition the pin 406 engages the plunger 404 to add the force of spring 405 to that of spring 400 opposing upward movement of the piston.

A link 406 is bent at one end for connection to an ear 407 of the piston 399 and at its other bent end extends through a hole 409 in one end of a link 408 forming part of a shift means operable by energization of piston and cylinder means 174 and 175 to effect a change in the forward drive range through the change speed mechanism. The link 408 at its opposite end is formed with a slot 410 into which a stem 412 carried by a crank arm 413 is disposed with the crank arm 413 being fixed to a shaft 414 which as shown in Figure 5 projects laterally outwardly a side wall of a switch housing 387 and to which shaft a crank arm 415 is secured. A gear shift drive rod 416 projects through the outer end of crank arm 415 and is pivotally connected at one end to the synchronizer shift lever 172. Coil spring assemblies 417 and 418 are carried by the gear shift rod 416 at either side of the crank arm 415 to provide a resilient connection between the rod 416 and the crank arm 415 in the rocking of the crank arm 415 by rocking of the synchronizer shift lever 172 for a purpose to be described. Referring again to Figures 6 and 7 a switch carrying plate member 420 is pivotally mounted about the reduced portion 385 of the shaft 384 and carries the micro-switch 255. The link 408 intermediate its end carries a stem 422 which extends into the switch carrying plate member 420 with movement of the link 408 in a manner to be described providing by means of the stem 422 for movement of the micro-switch 255 in a direction to advance it toward the switch actuator member 383. The micro-switch 255 as previously noted is of the single pole double throw type with the switch in the position thereof shown in Figure 6 normally closing a circuit between terminals 254 and 258 and normally opening a circuit between terminal 258 and terminal 296. However, upon relative movement of the switch actuator member 383 and of the switch carrying plate member 420 to advance the switch actuator member and the micro-switch 255 toward each other the projection 424 of the spring switch arm 425 is adapted to be engaged to bias the plunger 426 inwardly and which plunger 426 when biased inwardly effects opening of the normally closed circuit between terminals 254 and 258 and closing of the normally open circuit between terminals 258 and 298. With the manual switch lever 293 in driving range automatic position the circuit between terminals 254 and 258 when closed effects energization of the solenoid valve means 206 to provide for forward drive in low range between the drive and driven shafts, and upon opening of this circuit and closing of a circuit between terminals 258 and 298 the solenoid valve means 205 is energized to effect rocking of the synchronizer shift lever 172 to disengage the driven gear 33 from the driven shaft 30 and to clutch the driven shaft 30 to the drive shaft and effect forward direct drive or high range between the drive and driven shafts.

The position of the parts above described of the automatic control switch 209 as shown in Figure 6 indicates the condition in which the transmission is engaged for low range drive in the forward direction through the change speed gear mechanism in which the piston 399 in its lower position indicates low intake manifold vacuum and with the switch actuator 383 in its retracted position indicating low vehicle speed. With the transmission in position for effecting low range drive in the forward direction as described it will be observed that upon actuation of the throttle for the prime mover to increase the vehicle speed that the governor 42 is adapted to advance the switch actuator 383 to the position shown in Figure 9. However, upon depression of the accelerator the engine intake manifold vacuum remains low so that the piston 399 remains in its lowermost position with the arrangement of the parts being such that movement of the switch actuator 383 to its switch actuating position is not sufficient to trip the micro-switch 255. If the operator of the vehicle now releases the accelerator so that the piston 399 assumes the position shown in Figure 10 and assuming that the vehicle speed is sufficient to advance the switch actuator 383 to the position shown in this figure the micro-switch 255 is caused to be tripped which as previously noted effects opening of a circuit to the solenoid valve means 206 and closes the circuit to the solenoid valve means 205 to effect movement of the synchronizer shift lever 172 to engage clutch 44, and provide for direct drive or high range drive in a forward direction between the drive and driven shafts. Thus, if the vehicle speed condition is correct for a shift to take place from low range to high range; release of the accelerator by the operator effects the appropriate tripping of the micro-switch 255 to accomplish the shift.

Referring now to Figures 5 and 11 it will be seen that when a shift is effected from low range to direct forward drive or high range that rocking of the synchronizer shift lever 172 effects through gear shift draw rod 416 and through crank arm 415 rotation of shaft 414 and through crank arm 413 movement of the slotted end 410 of the link 408 to the position shown in Figure 10. This movement of the link 408 and by means of pin 422 having engagement with the plate carrier 420 advances the micro-switch 255 an additional increment so that upon subsequent opening of the throttle by the operator creating a low engine vacuum condition in which the piston 399 assumes the position shown in Figure 10 the micro-switch 255 is retained in tripped position to maintain a closed circuit to the electric solenoid valve means 205 so that the drive ratio through the transmission continues in direct forward drive or high range between the drive and driven shafts thereof. With the transmission now actuated for direct forward drive it will be seen that a shift to low range forward drive is under the control of the switch actuator member 383 responsive to the governor 42. Upon slowing of the vehicle to a predetermined speed the switch actuator 383 will be withdrawn from the micro-switch 255 an amount sufficient even when the latter is in its advanced position of Figure 11 to disengage from the projection 424 so that the micro-switch is actuated to open the circuit between terminals 258 and 298 and to reestablish the normally closed circuit between terminals 254 and 258. When this occurs the solenoid valve means 205 is deenergized and the solenoid valve means 206 is energized to effect rocking movement of the synchronizer shift lever 175 to disengage clutch means 44 from clutching the drive and driven shafts together, and to again clutch low range or reverse driven gear 33 to the driven shaft 30 so that the change speed mechanism is again actuated to provide low range forward drive between the drive and driven shafts. Rocking movement of the synchronizer shift lever 172 in the manner last described through gear shift draw rod 416 returns crank arms 415 and 413 to their initial positions shown in Figure 5 of the drawings. It will be observed that in order to effect the shift from high range or direct forward drive to low range forward drive that the vehicle speed must be such as to withdraw the switch actuator 383 from position for tripping the micro-switch 255. The provision of the auxiliary spring 405 prevents medium engine vacuum from disposing the piston 399 in its uppermost position in cylinder 398. Full high engine vacuum is necessary to overcome the force of both springs 400 and 405 so as to provide the mode of operation described. So long as the switch lever 293 is in driving range automatic position actuation of the transmission under the control of the throttle and also under the control of the governor responsive to the vehicle speed will be maintained in the manner above noted.

The automatic control switch and associated parts are preferably arranged and designed so in driving range automatic drive a shift from low range to high range drive may be effected at a range of about 15 to 25 miles per hour vehicle speed; and the shift from high range drive to low range drive may be effected at a range of about 10 to 19 miles per hour vehicle speed.

A pair of pins 430 and 432 mounted in bosses 433 and 434 are provided for the opposite ends of link 408 to support the same in its lowered position as shown in Figure 6. A screw 436 is also suitably adjustably threaded in housing 381 for engaging the slotted end 410 of link 408 to restrain the upward movement of the same when actuated to the position thereof shown in Figure 11.

In the transmission as above described it will be observed that the synchronizer clutch means 44 controls actuation of the transmission for high range drive by shifting of collar 55 as viewed in Figure 4 to its end left hand position, and for low range drive by shifting of collar 55 to its end right position. As previously related shifting of collar 55 from one to the other of its engaged positions is under the control of the direct drive piston and cylinder means 173 and the low or reverse drive piston and cylinder means 174. Upon admission of air under pressure to direct drive piston and cylinder means 173 the collar 55 is shifted to the left as viewed in Figure 4 to effect disengagement of the right hand ends of rocker arms 48 from clutch teeth 53 of low or reverse gear 33. Since these ends of the rocker arms 48 and clutch teeth 53 are of a formation so that they are normally self-disengaging only low air pressure of an amount to move the collar 55 off of the ends of rocker arms 48 to neutral position is necessary. Further movement of collar 55 to engage the left hand ends of rocker arms 48 with clutch teeth 52 is prevented by lock-out notches 66 so that air under pressure builds up in direct drive piston and cylinder means 173 behind piston 178 until the drive and driven shafts are in synchronism, whereupon the lock-out notches release the collar 55 for movement to the left by air pressure built up in the direct drive piston and cylinder means 173. Thus no reversal in torque is necessary to effect the shift and the building up of pressure in the direct drive piston and cylinder means 173 effects engagement of synchronizer clutch 44 to provide high range drive or direct drive in the forward direction. In shifting from high range drive or direct drive to low range drive the operation is the same. Air under low pressure is sufficient to move collar 55 off of the left hand ends of rocker arms 48 and with the collar in blocked position prior to clutching low range or reverse gear 33 to the driven shaft 30 air under pressure builds up in low or reverse piston and cylinder means 174 to effect shifting of collar 55 to engage the right hand ends of rocker arms 48 with clutch teeth 53 when the parts are in synchronism.

While I have shown and described what I consider to be the preferred embodiment of my invention it will be understood that various modifications and rearrangements may be made therein without departing from the spirit and scope of my invention.

I claim:

1. In a transmission having a drive shaft and a driven shaft, a drive gear for said drive shaft, a driven gear rotatably mounted on said driven shaft, a first clutch means operable in one clutching position to clutch said driven shaft to said drive shaft and in a second clutching position to clutch said driven gear to said driven shaft, first gear means between said drive and driven gears, second clutch means for said first gear means for clutching the latter in driving relation between said drive and driven gears, reverse gear means between said first gear means and said driven gear, and third clutch means for said reverse gear means for clutching the latter in driving relation between said first gear means and said driven gear, whereby when said third clutch means is engaged with said first clutch means in its said second clutching position, and said second clutch means disengaged, reverse drive is effected between said drive and driven shafts.

2. In a transmission having a drive shaft and a driven shaft, a drive gear for said drive shaft, a driven gear rotatably mounted on said driven shaft, first clutch means operable in one clutching position to clutch said driven shaft to said drive shaft and in a second clutching position to clutch said driven gear to said driven shaft, first gear means between said drive and driven gears, second clutch means for said first gear means for clutching the latter in driving relation between said drive and driven gears, reverse gear means between said first gear means and said driven gear, third clutch means for said reverse gear means for clutching the latter in driving relation between said first gear means and said driven gear, whereby when said third clutch means is engaged with said first clutch means in its said second clutching position, and said second clutch means disengaged, reverse drive is effected between said drive and driven shafts, and means interconnecting said second and third clutch means so that when one of them is engaged, the other is disengaged.

3. In a transmission having a drive shaft and a driven shaft, a drive gear for said drive shaft, a driven gear rotatably mounted on said driven shaft, first clutch means operable in one clutching position to clutch said driven shaft to said drive shaft and in a second clutching position to clutch said driven gear to said driven shaft, first gear means between said drive and driven gears, second clutch means for said first gear means for clutching the latter in driving relation between said drive and driven gears, reverse gear means between said first gear means and said driven gear, third clutch means for said reverse gear means for clutching the latter in driving relation between said first gear means and said driven gear, whereby when said third clutch means is engaged with said first clutch means in its said second clutching position, and said second clutch means disengaged, reverse drive is effected between said drive and driven shafts, means interconnecting said second and third clutch means so that when one of them is engaged the other is disengaged, and said last named means being operable for disengaging both of said second and third clutch means.

4. In a transmission having a drive shaft and a driven shaft the combination of a drive gear for said drive shaft, a driven gear rotatably mounted on said driven shaft, first clutch means between said drive and driven shafts operable in one position for clutching said shafts together for conjoint rotation and in a second position for clutching said driven gear to said driven shaft, a first countershaft, a gear fixed to said first countershaft and having meshing engagement with said drive gear, a gear rotatably mounted on said first countershaft and having meshing engagement with said driven gear, a second clutch means between said first countershaft and the gear rotatable thereon for clutching the latter to said first countershaft, a second countershaft, a gear fixed to said second countershaft, and having meshing engagement with the gear fixed to said first countershaft, a gear rotatably mounted on said second countershaft and having meshing engagement with said driven gear, third clutch means between said second countershaft and the gear rotatably mounted thereon for clutching the latter to said second countershaft, and means between said second and third clutch means operable so that when one of said last named clutches is engaged the other is disengaged.

5. In a transmission having a drive shaft and a driven shaft, a drive gear for said drive shaft, a driven gear rotatably mounted on said driven shaft, first clutch means for selectively clutching said driven shaft to said drive shaft or said driven gear to said driven shaft, first gear means between said drive and driven gears, second gear means between said first gear means and said driven gear, and second clutch means for said second gear means for clutching the latter in driving relation between said first gear means and said driven gear.

6. In a transmission having a drive shaft and a driven shaft, a drive gear for said drive shaft, a driven gear rotatably mounted on said driven shaft, first clutch means for selectively clutching said driven shaft to said drive shaft or said driven gear to said driven shaft, first gear means between said drive and driven gears, second clutch means for said first gear means for clutching the latter in driving relation between said drive and driven gears, second gear means between said first gear means and said driven gear, third clutch means for said second gear means for clutching the latter in driving relation between said first gear means and said driven gear, and means operably interconnecting the second and third clutch means whereby when one of them is engaged the other is disengaged.

7. A control system for a transmission having a drive shaft and a driven shaft, a drive gear for said drive shaft, a driven gear rotatably mounted on said driven shaft, first clutch means operable in one position to clutch said driven shaft to said drive shaft and in a second position to clutch said driven gear to said driven shaft, first gear means between said drive and driven gears, second clutch means for said first gear means for clutching the latter in driving relation between said drive and driven gears, reverse gear means between said first gear means and said driven gear, third clutch means for said reverse gear means for clutching the latter in driving relation between said first gear means and said driven gear, whereby when said third clutch means is engaged with said first clutch means in its said second position and said second clutch means disengaged, reverse drive is effected between said drive and driven shafts, comprising, a first pair of means associated with said first clutch means for actuating the latter to its first or second position, a second pair of means one associated with each of said second and third clutch means for actuating the latter to their engaged positions, and manually selectively operable means for effecting actuation of either of said first pair of means and with one of said first pair of means actuated for effecting actuation of either of said second pair of means.

8. A control system for a transmission having a drive shaft and a driven shaft, a drive gear for said drive shaft, a driven gear rotatably mounted on said driven shaft, first clutch means operable in one position to clutch said driven shaft to said drive shaft and in a second position to clutch said driven gear to said driven shaft, first gear means between said drive and driven gears, second clutch means for said first gear means for clutching the latter in driving relation between said drive and driven gears, reverse gear means between said first gear means and said driven gear, third clutch means for said reverse gear means for clutching the latter in driving relation between said first gear means and said driven gear, whereby when said third clutch means is engaged with said first clutch means in its said second position and said second clutch means disengaged, reverse drive is effected between said drive and driven shafts, comprising, first means associated with said first clutch means to actuate the latter to its said first position, second means associated with said first clutch means to actuate the latter to its said second position, third means associated with said second clutch means to actuate the latter to its engaged position, fourth means associated with said third clutch means to actuate the latter to its engaged position, and manually operable means associated with said first, second, third and fourth means for selectively effecting actuation of either said first or second means and for selectively effecting actuation of either said third or fourth means when said second means is actuated.

9. A control system for a transmission having a drive shaft and a driven shaft, a drive gear for said drive shaft, a driven gear rotatably mounted on said driven shaft, first clutch means operable in one position to clutch said driven shaft to said drive shaft and in a second position to clutch said driven gear to said driven shaft, first gear means between said drive and driven gears, second clutch means for said first gear means for clutching the latter in driving relation between said drive and driven gears, reverse gear means between said first gear means and said driven gear, third clutch means for said reverse gear means for clutching the latter in driving relation between said first gear means and said driven gear, whereby when said third clutch means is engaged with said first clutch means in its said second position and said second clutch means disengaged, reverse drive is effected between said drive and driven shafts, comprising, first and second means each including piston and cylinder means and solenoid valve means adapted when energized to admit air under pressure to said cylinder means associated with said first clutch means for actuating the same selectively to its first or second positions, third and fourth means each including piston and cylinder means and solenoid valve means adapted when energized to admit air under pressure to said cylinder means associated respectively with said second and third clutch means for selectively actuating the latter to their engaged positions, and manually operable switch means associated with said solenoid valve means of said first, second, third, and fourth means and a source of current positionable for effecting energization selectively of the solenoid valve means of said first or second means and for effecting energization selectively of said solenoid valve means of said third or fourth means when said solenoid valve means of said second means is energized.

10. A control system for a transmission having a drive shaft and a driven shaft, a drive gear for said drive shaft, a driven gear rotatably mounted on said driven shaft, first clutch means operable in one position to clutch said driven shaft to said drive shaft and in a second position to clutch said driven gear to said driven shaft, first gear means between said drive and driven gears, second clutch means for said first gear means for clutching the latter in driving relation between said drive and driven gears, reverse gear means between said first gear means and said driven gear, third clutch means for said reverse gear means for clutching the latter in driving relation between said first gear means and said driven gear, whereby when said third clutch means is engaged with said first clutch means in its said second position and said second clutch means disengaged, reverse drive is effected between said drive and driven shafts, comprising, first means associated with said first clutch means to actuate the latter to its said first position, second means associated with said first clutch means to actuate the latter to its said second position, third means associated with said second clutch means to actuate the latter to its engaged position, fourth means associated with said third clutch means to actuate the latter to its engaged position, manually operable means associated with said first, second, third, and fourth means for selectively effecting actuation of either said third or fourth means when said second means is actuated, and an automatic control switch associated with said first, second and third means operable for selectively effecting actuation of said first and second means and for selectively effecting actuation of said third means when said second means is actuated.

11. A control system for a transmission having a drive shaft and a driven shaft, a drive gear for said drive shaft, a driven gear rotatably mounted on said driven shaft, first clutch means operable in one position to clutch said driven shaft to said drive shaft and in a second position to clutch said driven gear to said driven shaft, first gear means between said drive and driven gears, second clutch means for said first gear means for clutching the latter in driving relation between said drive and driven gears, reverse gear means between said first gear means and said driven gear, third clutch means for said reverse gear means for clutching the latter in driving relation between said first gear means and said driven gear, whereby when said third clutch means is engaged with said first clutch means in its said second position and said second clutch means disengaged, reverse drive is effected between said drive and driven shaft, comprising, first and second means each including piston and cylinder means and solenoid valve means adapted when energized to admit air under pressure to said cylinder means associated with said first clutch means for actuating the same selectively to its first or second positions, third and fourth means each including piston and cylinder means and solenoid valve means adapted when energized to admit air under pressure to said cylinder means associated respectively with said second and third clutch means for selectively actuating the latter to their engaged positions, manually operable switch means associated with said solenoid valve means of said first, second, third, and fourth means and a source of current positionable for effecting energization selectively of the solenoid valve means of said first or second means and for effecting energization selectively of said solenoid valve means of said third or fourth means when said solenoid valve means of said second means is energized, and an automatic control switch associated with said solenoid valve means of said first, second and third means and a source of current operable for selectively effecting energization of the solenoid valve means of said first or second means and for effecting energization selectively of said solenoid valve means of said third means when said solenoid valve means of said second means is energized.

12. A control system for a transmission having a drive shaft and a driven shaft, a drive gear for said drive shaft, a driven gear rotatably mounted on said driven shaft, first clutch means operable in one position to clutch said driven shaft to said drive shaft and in a second position to clutch said driven gear to said driven shaft, first gear means between said drive and driven gears, second clutch means for said first gear means for clutching the latter in driving relation between said drive and driven gears, reverse gear means between said first gear means and said driven gear, third clutch means for said reverse gear means for clutching the latter in driving relation between said first gear means and said driven gear, whereby when said third clutch means is engaged with said first clutch means in its said second position and said second clutch means disengaged, reverse drive is effected between said drive and driven shafts, and means interconnecting said second and third clutch means operative so that when one of said second or third clutch means is engaged the other is disengaged, comprising, first means including solenoid valve means adapted when energized to effect actuation of said first clutch means to its said first position, second means including solenoid valve means adapted when energized to effect actuation of said third clutch means, and manually operable switch means associated with the solenoid valve means of said first and second means and a source of current positionable to effect energization of said solenoid valve means.

13. A control system for a transmission having a drive shaft and a driven shaft, a drive gear for said drive shaft, a driven gear rotatably mounted on said driven shaft, first clutch means operable in one position to clutch said driven shaft to said drive shaft and in a second position to clutch said driven gear to said driven shaft, first gear means between said drive and driven gears, second clutch means for said first gear means for clutching the latter in driving relation between said drive and driven gears, reverse gear means between said first gear means and said driven gear, third clutch means for said reverse gear means for clutching the latter in driving relation between said first gear means and said driven gear, whereby when said third clutch means is engaged with said first clutch means in its said second position and said second clutch means disengaged, reverse drive is effected between said drive and driven shafts, and means interconnecting said second and third clutch means operative so that when one of said second or third clutch means is engaged, the other is disengaged, comprising, first means including solenoid valve means adapted when energized to effect actuation of said first clutch means to its said second position, second means including solenoid valve means adapted when energized to effect actuation of said third clutch means, and manually operable switch means associated with the solenoid valve means of said first and second means and a source of current positionable to effect energization of said solenoid valve means.

14. A control system for a transmission having a drive shaft and a driven shaft, a drive gear for said drive shaft, a driven gear rotatably mounted on said driven shaft, first clutch means operable in one position to clutch said driven shaft to said drive shaft and in a second position to clutch said driven gear to said driven shaft, first gear means between said drive and driven gears, second clutch means for said first gear means for clutching the latter in driving relation between said drive and driven gears, reverse gear means between said first gear means and said driven gear, third clutch means for said reverse gear means for clutching the latter in driving relation between said first gear means and said driven gear, whereby when said third clutch means is engaged with said first clutch means in its said second position and said second clutch means disengaged, reverse drive is effected between said drive and driven shafts; and means interconnecting said second and third clutch means operative so that when one of said second or third clutch means is engaged the other is disengaged, comprising, first means including solenoid valve means adapted when energized to effect actuation of said first clutch means to its said second position, second means including solenoid valve means adapted when energized to effect actuation of said second clutch means, and manually operable switch means associated with the solenoid valve means of said first and second means and a source of current positionable to effect energization of said solenoid valve means.

15. A control system for a transmission having a drive shaft and a driven shaft, a drive gear for said drive shaft, a driven gear rotatably mounted on said driven shaft, first clutch means operable in one position to clutch said driven shaft to said drive shaft and in a second position to clutch said driven gear to said driven shaft, first gear means between said drive and driven gears, second clutch means for said first gear means for clutching the latter in driving relation between said drive and driven gears, reverse gear means between said first gear means and said driven gear, third clutch means for said reverse gear means for clutching the latter in driving relation between said first gear means and said driven gear, whereby when said third clutch means is engaged with said first clutch means in its said second position and said second clutch means disengaged, reverse drive is effected between said drive and driven shafts, and means interconnecting said second and third clutch means operative so that when one of said second or third clutch means is engaged, the other is disengaged, comprising, first means including first solenoid valve means adapted when energized to effect actuation of said first clutch means to its said first position, second means including second solenoid valve means adapted when energized to effect actuation of said first clutch means to its said second position, third means including third solenoid valve means adapted when energized to effect actuation of said third clutch means to its engaged position, manually operable switch means between said solenoid valve means and a source of current positionable to effect energization of said third solenoid valve means, and switch means between said first and second solenoid valve means operable upon energization of said third solenoid valve means to energize and then deenergize said first solenoid valve means and then energize said second solenoid valve means.

16. A control system for a transmission having a drive shaft and a driven shaft, a drive gear for said drive shaft, a driven gear rotatably mounted on said driven shaft, first clutch means operable in one position to clutch said driven shaft to said drive shaft and in a second position to clutch said driven gear to said driven shaft, first gear means between said drive and driven gears, second clutch means for said first gear means for clutching the latter in driving relation between said drive and driven gears, reverse gear means between said first gear means and said driven gear, third clutch means for said reverse gear means for clutching the latter in driving relation between said first gear means and said driven gear whereby when said third clutch means is engaged with said first clutch means in its said second position and said second clutch mean disengaged, reverse drive is effected between said drive and driven shafts, and means interconnecting said second and third clutch means operative so that when one of said second or third clutch means is engaged, the other is disengaged, comprising, first means including first solenoid valve means adapted when energized to effect actuating of said first clutch means to its said first position, second means including solenoid valve means adapted when energized to effect actuation of said first clutch means to its said second position, third means including third solenoid valve means adapted when energized to effect actuation of said second clutch means to its engaged position, manually operable switch means between said solenoid valve means and a source of current positionable to effect energization of said third solenoid valve means, and switch means between said first and second solenoid valve means operable upon energization of said third solenoid valve means to energize and then deenergize said first solenoid valve means and then energize said second solenoid valve.

17. A control system for a transmission for an automotive vehicle having an internal combustion engine and ignition system therefor, said transmission including a drive shaft and a driven shaft, a drive gear for said drive shaft, a driven gear rotatably mounted on said driven shaft, first clutch means operable in one position to clutch said driven shaft to said drive shaft and in a second position to clutch said driven gear to said driven shaft, first gear means between said drive and driven gears, second clutch means for said first gear means for clutching the latter in driving relation between said drive and driven gears, reverse gear means between said first gear means and said driven gear, third clutch means for said reverse gear means for clutching the latter in driving relation between said first gear means and said driven gear, whereby when said third clutch means is engaged with said first clutch means in its said second position and said second clutch means disengaged, reverse drive is effected between said drive and driven shafts, and means interconnecting said second and third clutch means operative so that when one of said second or third clutch means is engaged, the other is disengaged, comprising, first means associated with said first clutch means to actuate the latter to its said first position, second means associated with said first clutch means to actuate the latter to its said second position, third means associated with said second clutch means to actuate the latter to its engaged position, fourth means associated with said third clutch means to actuate the latter to its engaged position, manually operable switch means associated with said first, second, third and fourth means for selectively effecting actuation of either said third or fourth means when said second means is actuated, and switch means associated with said second means adapted upon actuation thereof to open and then close said ignition system.

18. A control system for a transmission for an automotive vehicle having an internal combustion engine and ignition system therefor, said transmission including a drive shaft and a driven shaft, a drive gear for said drive shaft, a driven gear rotatably mounted on said driven shaft, first clutch means operable in one position to clutch said driven shaft to said drive shaft and in a second position to clutch said driven gear to said driven shaft, first gear means between said drive and driven gears, second clutch means for said first gear means for clutching the latter in driving relation between said drive and driven gears, reverse gear means between said first gear means and said driven gear, third clutch means for said reverse gear means for clutching the latter in driving relation between said first gear means and said driven gear, whereby when said third clutch means is engaged with said first clutch means in its said second position and said second clutch means disengaged, reverse drive is effected between said drive and driven shafts, and means interconnecting said second and third clutch means operative so that when one of said second or third clutch means is engaged, the other is disengaged, comprising, first means associated with said first clutch means to actuate the latter to its said first position, second means associated with said first clutch mean to actuate the latter to its said second position, third means associated with said second clutch mean to actuate the latter to its engaged position, fourth means associated with said third clutch means to actuate the latter to its engaged position, manually operable switch means associated with said first, second, third and fourth means for selectively effecting actuation of either of said first or second means and for selectively effecting actuation of either said third or fourth means when said second means is actuated, switch means associated with said second means adapted upon actuation thereof to open and then close said ignition system, and an automatic control switch associated with said first, second and third means operable for selectively effecting actuation of said first or second means and for selectively effecting actuation of said third means when said second means is actuated.

19. A control system for a transmission for an automotive vehicle having an internal combustion engine including an intake manifold, governor means responsive to the speed of the vehicle, said transmission having a drive shaft and a driven shaft, a drive gear for said drive shaft, a driven gear rotatably mounted on said driven shaft, first clutch means operable in one position to clutch said driven shaft to said drive shaft and in a second position to clutch said driven gear to said driven shaft, first gear means between said drive and driven gears, second clutch means for said first gear means for clutching the latter in driving relation between said drive and driven gears, first means associated with said first clutch means to actuate the latter to its said first position, second means associated with said first clutch means to actuate the latter to its said second position, third means associated with said second clutch means to actuate the latter to its engaged position, an automatic control means operative in response to vacuum of said intake manifold and said governor means for effecting actuation of said first means, and for effecting actuation of said second and third means, shift means for conditioning operation of said automatic control means, and said shift means having connection with said first clutch means whereby upon movement of said first clutch means between its said two positions said shift means is actuated for conditioning said automatic control means.

20. A control system for a transmission for an automotive vehicle having an internal combustion engine including an intake manifold, governor means responsive to the speed of the vehicle, said transmission having a drive shaft and a driven shaft, a drive gear for said drive shaft, a driven gear rotatably mounted on said driven shaft, first clutch means operable in one position to clutch said driven shaft to said drive shaft and in a second position to clutch said driven gear to said driven shaft, first gear means between said drive and driven gears, second clutch means for said first gear means for clutching the latter in driving relation between said drive and driven gears, first means including a first solenoid valve means adapted when energized to actuate said first clutch means to its said first position, second means including solenoid valve means associated with said first clutch means and adapted when energized to actuate the latter to its said second position, third means including solenoid valve means associated with said second clutch means and adapted when energized to actuate the latter to its engaged position, and an automatic control switch associated with said solenoid valve means and a source of current supply operative in response to vacuum of said intake manifold and said governor means for effecting energization of said first solenoid valve means, and for effecting energization of said second and third solenoid valve means, shift means for conditioning operation of said automatic control switch, and said shift means having connection with said first clutch means whereby upon movement of said first clutch means between its said two positions said shift means is actuated for conditioning said automatic control switch.

21. A control system for a transmission for an automotive vehicle having an internal combustion engine including an intake manifold, governor means responsive to the speed of the vehicle, said transmission having a drive shaft and a driven shaft, a drive gear for said drive shaft, a driven gear rotatably mounted on said driven shaft, first clutch means operable in one position to clutch said driven shaft to said drive shaft and in a second position to clutch said driven gear to said driven shaft, first gear means between said drive and driven gears, second clutch means for said first gear means for clutching the latter in driving relation between said drive and driven gears, reverse gear means between said first gear means and said driven gear, third clutch means for said reverse gear means for clutching the latter in driving relation between said first gear means and said driven gear, whereby when said third clutch means is engaged with said first clutch means in its said second position and said second clutch means disengaged, reverse drive is effected between said drive and driven shafts, and means interconnecting said second and third clutch means operative so that when one of said second or third clutch means is engaged the other is disengaged comprising, first and second means each including piston and cylinder means and solenoid valve means adapted when energized to admit air under pressure to said cylinder means for actuating said first clutch means selectively to its said first or second positions, third and fourth means associated with said second and third clutch means each including piston and cylinder means and solenoid valve means adapted when energized to admit air under pressure to said cylinder means of said third and fourth means for selectively actuating said second and third clutch means to their engaged positions, a manually operable switch means associated with said solenoid valve means and a source of current positionable for effecting energization of said third solenoid valve means for engaging said second clutch means, and an automatic control switch associated with said manual switch and said first and second solenoid means operative in response to vacuum of said intake manifold and said governor means for effecting actuation of said first solenoid valve means and for effecting energization of said second solenoid valve means and said third solenoid valve means, shift means for conditioning operation of said automatic control switch, and said shift means having connection with said first clutch means whereby upon movement of said first clutch means between its said two positions said shift means is actuated for conditioning said automatic control switch.

22. A control system for a transmission for an automotive vehicle having an internal combustion engine including an intake manifold, governor means responsive to the speed of the vehicle, said transmission having a drive shaft and a driven shaft, a drive gear for said drive shaft, a driven gear rotatably mounted on said driven shaft, first clutch means operable in one position to clutch said driven shaft to said drive shaft and in a second position to clutch said driven gear to said driven shaft, first gear means between said drive and driven gears, second clutch means for said first gear means for clutching the latter in driving relation between said drive and driven gears, reverse gear means between said first gear means and said driven gear, third clutch means for said reverse gear means for clutching the latter in driving relation between said first gear means and said driven gear, whereby when said third clutch means is engaged with said first clutch means in its second position and said second clutch means disengaged, reverse drive is effected between said drive and driven shafts, and means interconnecting said second and third clutch means operative so that when one of said second or third clutch means is engaged, the other is disengaged, comprising, first means including first solenoid valve means associated with said first clutch means to actuate the latter to its said first position, second means including second solenoid valve means associated with said first clutch means to actuate the latter to its second position, third means including third solenoid valve means associated with said second clutch means to actuate the latter to its engaged position, manually operable switch means associated with said solenoid valve means positionable for effecting energization of said third solenoid valve means, automatic control switch means, shift means for conditioning operation of said automatic control switch means, said shift means having connection with said first clutch means whereby upon movement of said first clutch means between its said two positions said shift means is actuated for conditioning said automatic control switch means, and said automatic control switch means being associated with said manual switch means and said solenoid valve means operable in response to high vacuum in said intake manifold and said governor means at a predetermined vehicle speed to effect energization of said first solenoid valve means and deenergization of said second solenoid valve means, and operable in response to low vacuum in said intake manifold, said governor means and said shift means at a predetermined slow vehicle speed to effect energization of said second solenoid valve means and deenergization of said first solenoid valve means.

23. A control system for a transmission for an automotive vehicle having an internal combustion engine including an intake manifold, an ignition system for the internal combustion engine, governor means responsive to the speed of the vehicle, said transmission having a drive shaft and a driven shaft, a drive gear for said drive shaft, a driven gear rotatably mounted on said driven shaft, first clutch means operable in one position to clutch said driven shaft to said drive shaft and in a second position to clutch said driven gear to said driven shaft, first gear means between said drive and driven gears, second clutch means for said first gear means for clutching the latter in driving relation between said drive and driven gears, reverse gear means between said first gear means and said driven gear, third clutch means for said reverse gear means for clutching the latter in driving relation between said first gear means and said driven gear, whereby when said third clutch means is engaged with said first clutch means in its second position and said second clutch means disengaged, reverse drive is effected between said drive and driven shafts, and means interconnecting said second and third clutch means operative so that when one of said second or third clutch means is engaged, the other is disengaged, comprising, first means including first solenoid valve means associated with said first clutch means to actuate the latter to its said first position, second means including second solenoid valve means associated with said first clutch means to actuate the latter to its said second position, third means including third solenoid valve means associated with said second clutch means to actuate the latter to its engaged position, manually operable switch means associated with said solenoid valve means positionable for effecting energization of said third solenoid valve means, automatic control switch means, shift means for conditioning operation of said automatic control switch means, said shift means having connection with said first clutch means whereby upon movement of said first clutch means between its said two positions said shift means is actuated for conditioning said automatic control switch means, associated with said manual switch means and said solenoid valve means operable in response to high vacuum in said intake manifold and said governor means at a predetermined vehicle speed to effect energization of said first solenoid valve means and deenergization of said second solenoid valve means, and operable in response to low vacuum in said intake manifold, said governor means and said shift means at a predetermined slow vehicle speed to effect energization of said second solenoid valve means and deenergization of said first solenoid valve means, and switch means between said first and second solenoid valve means operative upon the energization of one of them and deenergization of the other thereof to effect momentary opening of the ignition system for the internal combustion engine of the vehicle.

24. A control system for a transmission for an automotive vehicle having an internal combustion engine including an intake manifold, governor means responsive to the speed of the vehicle, said transmission having gear means between drive and driven shafts thereof for effecting direct forward drive or low range forward drive between said shafts, a first clutch associated with said gear means operable in one position to effect said direct forward drive and in a second position to condition said gear means for effecting said low range forward drive, second clutch means for said gear means operable when engaged with said first clutch means in its second position for effecting said low range forward drive comprising, first means including first solenoid valve means associated with said first clutch to actuate the latter to its said first position, second means including second solenoid valve means associated with said first clutch to actuate the latter to its said second position, third means including third solenoid valve means associated with said second clutch to actuate the latter to its engaged position, manually operable switch means associated with said solenoid valve means positionable for effecting energization of said third solenoid valve means, automatic control switch means associated with said manual switch means and said solenoid valve means operable in response to high vacuum in said intake manifold and to said governor means at a predetermined fast vehicle speed to effect energization of said first solenoid valve means and deenergization of said second solenoid valve means, and at low vacuum in said intake manifold and to said governor means at a predetermined slow vehicle speed to effect energization of said second solenoid valve means and deenergization of said first solenoid valve means, and means between the first and second solenoid valve means and said automatic control switch adapted when said first solenoid valve means is energized to provide direct forward drive between said drive and driven shafts to maintain said first solenoid valve means energized at high intake manifold vacuum and slow vehicle speed.

25. An automatic control switch for a control system for a transmission for a vehicle having an engine including an intake manifold and governor means responsive to the speed of the vehicle comprising, a double throw single pole switch for normally maintaining one circuit therethrough closed and another circuit therethrough open, a switch actuator member movable in response to said governor means, means including a plate member carrying said switch movable toward and away from said switch actuator respectively at high and low intake manifold vacuum, said switch actuator member being movable toward and away from said switch respectively at high and low vehicle speeds, and said switch actuator member at a predetermined speed of said vehicle and said means carrying said switch at a predetermined vacuum of said intake manifold providing for tripping said switch to open said normally closed circuit and close said normally open circuit.

26. An automatic control switch for a control system for a transmission for a vehicle having an engine including an intake manifold and governor means responsive to the speed of the vehicle comprising, a double throw single pole switch for normally maintaining one circuit therethrough closed and another circuit therethrough open, a switch actuator member movable in response to said governor means, means including a plate member carrying said switch movable toward and away from said switch actuator respectively at high and low intake manifold vacuum, said switch actuator member being movable toward and away from said switch respectively at high and low vehicle speeds, said switch actuator member at a predetermined speed of said vehicle and said means carrying said switch at a predetermined vacuum of said intake manifold providing for tripping switch to open said normally closed circuit and close said normally open circuit, and crank means associated with said means carrying said switch adapted when actuated to advance said switch toward said switch actuator member whereby upon retraction of the latter at a predetermined low vehicle speed said switch is maintained tripped.

27. In a transmission having drive and driven shafts, the combination of gear means between said shafts, clutch means associated with said gear means and including normally self disengaging first and second clutch elements, selector means for said clutch means for maintaining selectively said first clutch elements engaged to effect one driving relation through said gear means between said drive and driven shafts, or said second clutch elements engaged to effect a second driving relation through said gear means between said drive and driven shafts, said selector means having a neutral position in which both of said first and second clutch elements are disengaged, synchronizer means for said clutch means for preventing shifting of said selector means to effect one or the other of said driving relations until said gear means is in synchronism for the driving relation to be selected, means for said selector means for shifting the same to disengage selectively either of said first or second clutch elements and to position the same in its neutral position, and said last named means including means for shifting said selector means from its neutral position substantially instantaneously to position to engage selectively said clutch elements upon said synchronization of said gear means in changing from one driving relation to the other driving relation between said shafts.

28. In a transmission having drive and driven shafts, the combination of gear means between said shafts, clutch means associated with said gear means and including normally self-disengaging first and second clutch elements, selector means for said clutch means for maintaining selectively said first clutch elements engaged to effect one driving relation through said gear means between said drive and driven shafts, or said second clutch elements engaged to effect a second driving relation through said gear means between said drive and driven shafts, said selector means having a neutral position in which both of said first and second clutch elements are disengaged, synchronizer means for said clutch means for preventing shifting of said selector means to effect one or the other of said driving relations until said gear means is in synchronism for the driving relation to be selected, a pair of piston and cylinder means having connection with a source of air under pressure selectively operable for shifting said selector means to disengage selectively said first and second clutch elements and to position the same in neutral position, said piston and cylinder means selectively upon shifting of said selector means to neutral position being adapted to have air under pressure built up therein from said source of air under pressure to effect substantially instantaneous shifting of said selector means from neutral position to a position to engage selectively said clutch elements while said synchronizer means is effecting synchronization of said gear means in changing from one driving relation to the other driving relation between said shafts.

ROBERT LAPSLEY.

References Cited in the file of this patent

UNITED STATES PATENTS

| Number | Name | Date |
|---|---|---|
| 1,780,858 | Bearens | Nov. 4, 1930 |
| 1,980,505 | Snow et al. | Nov. 13, 1934 |
| 2,092,580 | Kelley | Sept. 7, 1937 |
| 2,180,019 | Peterson | Nov. 14, 1939 |
| 2,342,960 | Neracher et al. | Feb. 29, 1944 |
| 2,356,598 | Lang et al. | Aug. 22, 1944 |
| 2,386,217 | Kegresse | Oct. 9, 1945 |
| 2,426,234 | Neracher et al. | Aug. 26, 1947 |
| 2,440,558 | Price | Apr. 27, 1948 |

FOREIGN PATENTS

| Number | Country | Date |
|---|---|---|
| 609,389 | Great Britain | Sept. 30, 1948 |